(12) United States Patent
Sullivan et al.

(10) Patent No.: US 12,509,971 B2
(45) Date of Patent: Dec. 30, 2025

(54) ROLLER BEARING ASSEMBLY, AND METHOD OF GROUNDING A PERFORATING GUN ASSEMBLY

(71) Applicant: XConnect, LLC, Denver, CO (US)

(72) Inventors: Shelby L. Sullivan, Minot, ND (US); Joshua M. Scott, Katy, TX (US)

(73) Assignee: XConnect, LLC, Denver, CO (US)

( * ) Notice: Subject to any disclaimer, the term of this patent is extended or adjusted under 35 U.S.C. 154(b) by 90 days.

(21) Appl. No.: 18/586,504

(22) Filed: Feb. 25, 2024

(65) Prior Publication Data
US 2024/0352834 A1    Oct. 24, 2024

Related U.S. Application Data

(63) Continuation-in-part of application No. 18/435,553, filed on Feb. 7, 2024, now Pat. No. 12,410,690, and
(Continued)

(51) Int. Cl.
*E21B 43/119* (2006.01)
*F16C 19/36* (2006.01)
*F16C 41/00* (2006.01)

(52) U.S. Cl.
CPC .......... *E21B 43/119* (2013.01); *F16C 19/361* (2013.01); *F16C 41/002* (2013.01); *F16C 2352/00* (2013.01)

(58) Field of Classification Search
CPC ....... E21B 43/11; F16C 19/364; F16C 41/002
See application file for complete search history.

(56) References Cited

U.S. PATENT DOCUMENTS 582,343 A * 5/1897 Grant .............. B61F 5/14
384/423
1,282,714 A * 10/1918 Olson .............. A41H 37/02
227/15
(Continued)

FOREIGN PATENT DOCUMENTS

CN    2698970 Y    5/2005

OTHER PUBLICATIONS

Machine translation of the Abstract of Foreign Reference: CN 2698970 Y, Published: May 11, 2005; Baoji Oilfield Machinery Co Ltd; 1 page.
(Continued)

*Primary Examiner* — Yanick A Akaragwe
(74) *Attorney, Agent, or Firm* — Peter L. Brewer; Thrive IP

(57) ABSTRACT

A bearing member assembly used in a wellbore completion operation. The bearing member assembly first comprises a tubular sub. The tubular sub has a first end, a second end opposite the first end, and connection threads residing at each of the first and second ends. The bearing member assembly also comprises an internal bore, and a tapered shoulder residing along the internal bore proximate the second end. The tapered shoulder defines an angle relative to the central axis of the internal bore. The bearing member assembly also comprises a bearing member. The bearing member has a tubular support body wherein an inner diameter forms a bore and an outer diameter serves as a race. A plurality of roller bearings are disposed along the race, engaging the tapered shoulder to serve as a grounding path. A cage secures the roller bearings against the race. A method of grounding a perforating gun assembly is also provided herein.

10 Claims, 16 Drawing Sheets

Related U.S. Application Data a continuation-in-part of application No. 29/920,858, filed on Dec. 13, 2023, now Pat. No. Des. 1,082,873, and a continuation-in-part of application No. 29/920,815, filed on Dec. 13, 2023.

(60) Provisional application No. 63/511,903, filed on Jul. 5, 2023, provisional application No. 63/497,305, filed on Apr. 20, 2023.

(56) References Cited

U.S. PATENT DOCUMENTS

| | | |
|---|---|---|
| 3,181,608 A | 5/1965 | Palmer |
| 3,605,918 A | 9/1971 | Bennett |
| 4,194,577 A | 3/1980 | Vann |
| 4,269,278 A | 5/1981 | Vann |
| 5,571,986 A | 11/1996 | Snider et al. |
| 5,869,968 A | 2/1999 | Brooks et al. |
| 5,911,277 A | 6/1999 | Hromas et al. |
| 6,837,310 B2 | 1/2005 | Martin |
| 7,213,655 B2 | 5/2007 | Parrott |
| 7,886,842 B2 | 2/2011 | Howard et al. |
| 8,028,751 B2 | 10/2011 | Pinto et al. |
| 8,186,259 B2 | 5/2012 | Burleson et al. |
| 8,684,083 B2 | 4/2014 | Torres et al. |
| 9,115,572 B1 | 8/2015 | Hardesty et al. |
| 9,399,897 B2 | 7/2016 | Stokes |
| 9,500,071 B2 | 11/2016 | Morgan-Smith et al. |
| 9,523,266 B2 | 12/2016 | Arena |
| 9,581,422 B2 | 2/2017 | Preiss et al. |
| 9,598,942 B2 | 3/2017 | Wells et al. |
| 9,644,460 B2 | 5/2017 | Bell et al. |
| 9,689,223 B2 | 6/2017 | Schacherer et al. |
| 9,784,549 B2 | 10/2017 | Eitschberger |
| 9,803,455 B1 | 10/2017 | Yang et al. |
| 9,845,666 B2 | 12/2017 | Hardesty et al. |
| 10,036,236 B1 | 7/2018 | Sullivan et al. |
| 10,062,476 B2 | 8/2018 | Varkey et al. |
| 10,113,401 B2 | 10/2018 | Al-Gouhi |
| 10,233,743 B2 | 3/2019 | Morgan-Smith et al. |
| 10,273,760 B2 | 4/2019 | Cook et al. |
| 10,273,788 B2 | 4/2019 | Bradley et al. |
| 10,316,634 B2 | 6/2019 | Graham et al. |
| 10,337,310 B2 | 7/2019 | Bell et al. |
| 10,352,136 B2 | 7/2019 | Goyeneche |
| 10,358,897 B2 | 7/2019 | Bowen et al. |
| 10,392,888 B2 | 8/2019 | Robertson et al. |
| 10,444,392 B2 | 10/2019 | Milne et al. |
| 10,458,213 B1 | 10/2019 | Eitschberger et al. |
| 10,465,488 B2 | 11/2019 | Collins et al. |
| 10,472,937 B2 | 11/2019 | Walters et al. |
| 10,526,876 B2 | 1/2020 | Hess et al. |
| 10,584,950 B2 | 3/2020 | Saltarelli et al. |
| 10,590,706 B2 | 3/2020 | Hess et al. |
| 10,597,979 B1 | 3/2020 | Eitschberger et al. |
| 10,683,740 B2 | 6/2020 | Randall et al. |
| 10,689,955 B1 | 6/2020 | Mauldin et al. |
| 10,731,444 B2 | 8/2020 | Wells et al. |
| 10,844,696 B2 | 11/2020 | Eitschberger et al. |
| 10,844,697 B2 | 11/2020 | Preiss et al. |
| D904,475 S | 12/2020 | Preiss et al. |
| D908,754 S | 1/2021 | Eitschberger et al. |
| 10,954,769 B2 | 3/2021 | Randall et al. |
| 10,975,671 B2 | 4/2021 | Bradley et al. |
| D920,402 S | 5/2021 | Eitschberger et al. |
| D921,858 S | 6/2021 | Eitschberger et al. |
| D922,541 S | 6/2021 | Mulhern et al. |
| 11,053,782 B2 | 7/2021 | Loehken et al. |
| 11,078,762 B2 | 8/2021 | Mauldin et al. |
| 11,125,056 B2 | 9/2021 | Parks et al. |
| D935,574 S | 11/2021 | Eitschberger et al. |
| 11,225,848 B2 | 1/2022 | Eitschberger |
| 11,248,452 B2 | 2/2022 | Sullivan et al. |
| 11,255,650 B2 | 2/2022 | Sullivan et al. |
| 11,293,737 B2 | 4/2022 | Sullivan et al. |
| 11,299,967 B2 | 4/2022 | Bradley et al. |
| D951,207 S | 5/2022 | Donauer |
| 11,402,190 B2 | 8/2022 | Sullivan et al. |
| 11,428,081 B2 | 8/2022 | Bradley et al. |
| 11,480,038 B2 | 10/2022 | Eitschberger |
| D968,474 S | 11/2022 | Volberg |
| 11,536,118 B2 | 12/2022 | Sullivan et al. |
| 11,624,266 B2 | 4/2023 | Mauldin et al. |
| 11,629,579 B2 | 4/2023 | Davis et al. |
| 11,668,166 B2 | 6/2023 | Lopez de Cardenas et al. |
| 11,674,371 B1 * | 6/2023 | Bradley ............... E21B 43/119 89/1.15 |
| D994,736 S | 8/2023 | Sullivan |
| 11,713,661 B2 | 8/2023 | Oehring et al. |
| 11,725,506 B2 | 8/2023 | Shahkarami et al. |
| 11,753,917 B2 | 9/2023 | Shetty et al. |
| 11,795,791 B2 | 10/2023 | Eitschberger et al. |
| 11,795,792 B2 | 10/2023 | Archibald et al. |
| 11,834,940 B1 | 12/2023 | Kohli et al. |
| 11,906,278 B2 | 2/2024 | Sullivan |
| 11,913,767 B2 | 2/2024 | Sullivan et al. |
| 2003/0047358 A1 | 3/2003 | Bonkowski |
| 2003/0098158 A1 | 5/2003 | George et al. |
| 2004/0144539 A1 | 7/2004 | Smith et al. |
| 2006/0108148 A1 * | 5/2006 | Walker ............... E21B 43/1185 175/4.6 |
| 2011/0132607 A1 | 6/2011 | Lahitette et al. |
| 2012/0061098 A1 | 3/2012 | Hall |
| 2014/0020896 A1 | 1/2014 | Al-Gouhi |
| 2014/0131035 A1 | 5/2014 | Entchev et al. |
| 2014/0137723 A1 | 5/2014 | Umphries et al. |
| 2014/0158432 A1 | 6/2014 | Simpson |
| 2015/0000509 A1 | 1/2015 | Current et al. |
| 2015/0330192 A1 | 11/2015 | Rogman et al. |
| 2016/0024858 A1 | 1/2016 | Hanton et al. |
| 2016/0061572 A1 | 3/2016 | Eitschberger et al. |
| 2016/0084048 A1 | 3/2016 | Harrigan et al. |
| 2016/0168961 A1 | 6/2016 | Parks et al. |
| 2016/0237752 A1 | 8/2016 | Jones |
| 2016/0333675 A1 | 11/2016 | Wells et al. |
| 2017/0051586 A1 | 2/2017 | Wells et al. |
| 2017/0074078 A1 | 3/2017 | Eitschberger |
| 2017/0211363 A1 | 7/2017 | Bradley et al. |
| 2017/0241209 A1 | 8/2017 | Benes |
| 2018/0016846 A1 | 1/2018 | Peter et al. |
| 2018/0058167 A1 | 3/2018 | Finol et al. |
| 2018/0112465 A1 | 4/2018 | Ritchie et al. |
| 2018/0112524 A1 | 4/2018 | Huang et al. |
| 2018/0119529 A1 | 5/2018 | Goyeneche |
| 2018/0135389 A1 | 5/2018 | Sullivan et al. |
| 2018/0259051 A1 * | 9/2018 | Chinitz ............... F16C 19/548 |
| 2018/0347324 A1 | 12/2018 | Langford et al. |
| 2019/0048693 A1 | 2/2019 | Henke et al. |
| 2019/0136673 A1 | 5/2019 | Sullivan et al. |
| 2019/0145216 A1 | 5/2019 | Shampine |
| 2019/0153829 A1 | 5/2019 | Roessler |
| 2019/0153841 A1 | 5/2019 | Randall et al. |
| 2019/0211655 A1 | 7/2019 | Bradley et al. |
| 2019/0242199 A1 | 8/2019 | Al-Qasim et al. |
| 2019/0257181 A1 | 8/2019 | Langford et al. |
| 2019/0264548 A1 | 8/2019 | Zhao et al. |
| 2019/0277093 A1 | 9/2019 | Morin |
| 2020/0024935 A1 | 1/2020 | Eitschberger et al. |
| 2020/0063537 A1 | 2/2020 | Langford et al. |
| 2020/0157924 A1 | 5/2020 | Melhus et al. |
| 2020/0284104 A1 | 9/2020 | Holmberg et al. |
| 2020/0392821 A1 | 12/2020 | Eitschberger et al. |
| 2020/0399995 A1 | 12/2020 | Preiss et al. |
| 2021/0131205 A1 | 5/2021 | Tran |
| 2021/0270104 A1 | 9/2021 | Løvoll et al. |
| 2021/0301599 A1 | 9/2021 | Mulhern et al. |
| 2022/0003085 A1 | 1/2022 | Loehken |
| 2022/0018638 A1 | 1/2022 | Bergmann et al. |
| 2022/0049588 A1 | 2/2022 | Sampson |
| 2022/0195824 A1 | 6/2022 | Scharf et al. |
| 2022/0205344 A1 | 6/2022 | Hoelscher et al. |
| 2022/0243567 A1 | 8/2022 | Eitschberger et al. |
| 2022/0268135 A1 | 8/2022 | Eitschberger et al. |
| 2022/0282578 A1 | 9/2022 | Eitschberger |

(56) References Cited

U.S. PATENT DOCUMENTS

| | | |
|---|---|---|
| 2022/0307330 A1 | 9/2022 | Eitschberger et al. |
| 2022/0316283 A1 | 10/2022 | Eitschberger et al. |
| 2022/0356793 A1 | 11/2022 | Zitting |
| 2022/0403718 A1 | 12/2022 | Eitschberger et al. |
| 2022/0412195 A1 | 12/2022 | Vriend et al. |
| 2023/0003106 A1 | 1/2023 | Conzemius |
| 2023/0193711 A1 | 6/2023 | Eitschberger et al. |
| 2023/0203896 A1 | 6/2023 | Yard |
| 2023/0203923 A1 | 6/2023 | Eitschberger |
| 2023/0220731 A1 | 7/2023 | Moyes |
| 2023/0265748 A1 | 8/2023 | Bradley et al. |
| 2023/0266109 A1 | 8/2023 | Teowee et al. |
| 2023/0296364 A1 | 9/2023 | Teowee et al. |
| 2023/0304384 A1 | 9/2023 | Rajaram et al. |
| 2023/0323739 A1 | 10/2023 | Eitschberger |
| 2023/0332641 A1 | 10/2023 | Moyes |
| 2023/0349238 A1 | 11/2023 | Martin |
| 2023/0349272 A1 | 11/2023 | Blois et al. |
| 2023/0349677 A1 | 11/2023 | Scharf et al. |
| 2023/0358105 A1 | 11/2023 | Oettli |
| 2023/0366298 A1 | 11/2023 | Sullivan |
| 2023/0366299 A1 | 11/2023 | Badii et al. |
| 2023/0374892 A1 | 11/2023 | Dyess et al. |
| 2023/0383625 A1 | 11/2023 | Eitschberger et al. |
| 2023/0392592 A1 | 12/2023 | Shampine et al. |
| 2024/0035354 A1 | 2/2024 | Mcwilliam |
| 2024/0183252 A1 | 6/2024 | Sullivan et al. |

OTHER PUBLICATIONS

U.S. Appl. No. 29/920,858, filed: Dec. 13, 2023; Inventors: Shelby L. Sullivan and Joshua M. Scott; 17 pages.

U.S. Appl. No. 29/920,815, filed: Dec. 13, 2023; Inventors: Shelby L. Sullivan and Joshua M. Scott; 7 pages.

An identification of earlier applications pursuant to 37 CFR 1.98 (d)(1) is attached listing: U.S. Appl. No. 29/920,815; U.S. Appl. No. 29/920,815; and U.S. Publication No. 2024/0183252; 1 page.

* cited by examiner

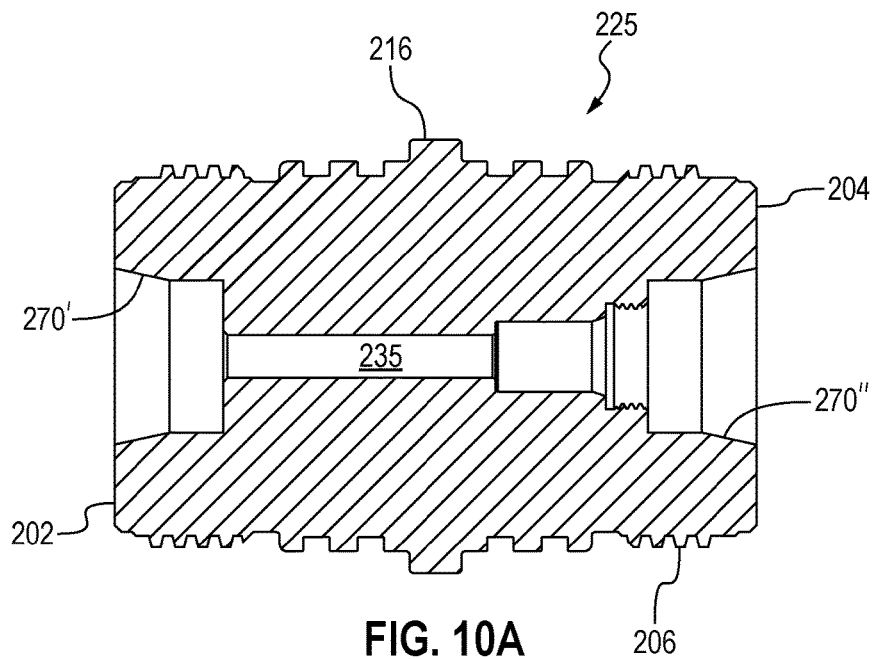
FIG. 10A
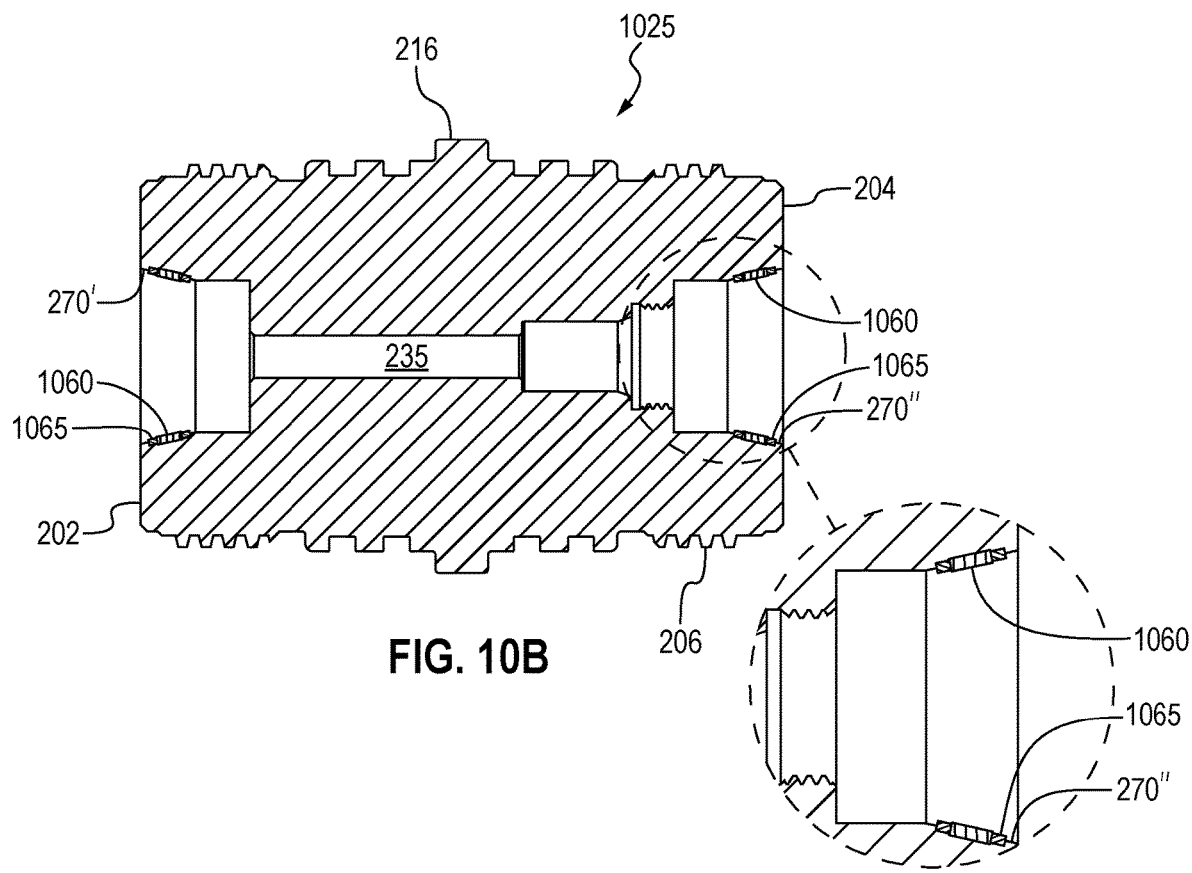
FIG. 10B
FIG. 10C

ROLLER BEARING ASSEMBLY, AND METHOD OF GROUNDING A PERFORATING GUN ASSEMBLY

CROSS REFERENCE TO RELATED APPLICATIONS

This application is filed as a continuation-in-part of U.S. Ser. No. 18/435,553. That application was filed on Feb. 7, 2024 and was entitled "Orienting Perforating Gun System, and Method of Orienting Shots in a Perforating Gun Assembly."

The parent application claimed the benefit of U.S. Ser. No. 63/497,305. That application was filed on Apr. 20, 2023 and was entitled "Orienting Perforating Gun System, and Method of Orienting Shots in a Perforating Gun Assembly."

The parent application also claimed the benefit of U.S. Ser. No. 63/511,903. That application was filed on Jul. 5, 2023 and was entitled "Orienting Perforating Gun System, and Method of Orienting Shots in a Perforating Gun Assembly."

The parent application was filed as a continuation-in-part of U.S. Ser. No. 29/920,858 filed Dec. 13, 2023. That application is titled "Tandem Sub for a Roller Bearing."

The parent application was also filed as a continuation-in-part of U.S. Ser. No. 29/920,815 filed Dec. 13, 2023. That application is titled "Roller Bearing for a Tandem Sub."

Each of these filings is incorporated herein in its entirety by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present invention. Accordingly, it should be understood that this section should be read in this light, and not necessarily as admissions of prior art.

Field of the Invention

The present disclosure relates to the field of hydrocarbon recovery operations. More specifically, the disclosure relates to the completion of a well for the production of oil and gas. More specifically still, the inventions herein relate to a perforating gun assembly wherein the shots along the perforating guns may be selectively oriented.

Technology in the Field of the Invention

In the drilling of an oil and gas well, a near-vertical wellbore is formed through the earth using a drill bit urged downwardly at a lower end of a drill string. After drilling to a predetermined depth, the drill string and bit are removed and the wellbore is lined with a string of casing. An annular area is thus formed between the string of casing and the formation penetrated by the wellbore.

A cementing operation is conducted in order to fill or "squeeze" the annular area with cement along part or all of the length of the wellbore. The combination of cement and casing strengthens the wellbore and facilitates zonal isolation, and subsequent completion, of hydrocarbon-producing pay-zones behind the casing.

In connection with the completion of the wellbore, several strings of casing having progressively smaller outer diameters will be cemented into the wellbore. These will include a string of surface casing, one or more strings of intermediate casing, and finally a string of production casing. The process of drilling and then cementing progressively smaller strings of casing is repeated until the well has reached total depth ("TD"). In some instances, the final string of casing is a liner, that is, a string of casing that is not tied back to the surface.

Within the last two decades, advances in drilling technology have enabled oil and gas operators to "kick-off" and steer wellbore trajectories from a vertical orientation to a near-horizontal orientation. The horizontal "leg" of each of these wellbores now often exceeds a length of one mile, and sometimes two or even three miles. This significantly multiplies the wellbore exposure to a target hydrocarbon-bearing formation. The horizontal leg will typically include the production casing.

FIG. 1 is a side, cross-sectional view of a wellbore 100, in one embodiment. The wellbore 100 has been completed horizontally, that is, it is completed with a horizontal leg 156. The wellbore 100 defines a bore 10 that has been drilled from an earth surface 105 into a subsurface 110. The wellbore 100 is formed using any known drilling mechanism, but preferably using a land-based rig or an offshore drilling rig on a platform.

The wellbore 100 is completed with a first string of casing 120, sometimes referred to as surface casing. The wellbore 100 is further completed with a second string of casing 130, typically referred to as an intermediate casing. In deeper wells, that is wells completed 7,500 feet or more below the earth surface 105, at least two intermediate strings of casing will be used. In FIG. 1, a second intermediate string of casing is shown at 140. Together, casings 130, 140 comprise intermediate casing strings.

The wellbore 100 is finally completed with a string of production casing 150. In the view of FIG. 1, the production casing 150 extends from the surface 105 down to a subsurface formation, or "pay-zone" 115. As noted, the wellbore 100 is completed horizontally, meaning that a horizontal portion (indicated by leg 156) is provided. The horizontal portion 156 includes a heel 153 and a toe 154. In this instance, the toe 154 defines the end (or "TD") of the wellbore 100.

It is observed that the annular region around the surface casing 120 is filled with cement 125. The cement (or cement matrix) 125 serves to isolate the wellbore from fresh water zones and potentially porous formations around the production casing 120.

The annular regions around the intermediate casing strings 130, 140 are also filled with cement 135, 145. Similarly, the annular region around the production casing 150 is filled with cement 155. However, the cement 135, 145, 155 is optionally only placed behind the respective casing strings 130, 140, 150 up to the lowest joints of the immediately surrounding casing strings. Thus, a non-cemented annular region 132 is typically preserved above the cement matrix 135; a non-cemented annular region 142 is typically preserved above the cement matrix 145; and a non-cemented annular region 152 is frequently preserved above the cement matrix 155.

In order to facilitate the recovery of hydrocarbons, particularly in low-permeability formations 115, the production casing 150 along the horizontal portion 156 undergoes a process of perforating and fracturing (or in some cases perforating and acidizing). Due to the very long lengths of new horizontal wells, the perforating and formation treatment process is carried out in multiple stages.

In one method, a perforating gun assembly 200 is pumped down the wellbore 100 towards the toc 154 at the end of a wireline 240. The perforating gun assembly 200 will include a series of perforating guns (shown at 210 in FIG. 2), with each perforating gun 210 having sets of charges ready for detonation. The charges associated with one of the perforating guns 210 are detonated, and perforations are "shot" into the casing 150. Those of ordinary skill in the art will understand that the perforating guns 210 have explosive charges, typically shaped charges, which are ignited to create holes in the casing 150 (and, if present, the surrounding cement) and pass at least a few inches, and possibly several feet, into the formation 115. The perforations (not shown) create fluid communication with the surrounding formation 115 such that hydrocarbon fluids can flow out of the formation 115, into the casing 150, and up to the surface 105.

After perforating, the operator will fracture the formation 115 through the perforations. This is done by pumping treatment fluids into the formation 115 at a pressure above a formation parting pressure. After the fracturing operation is complete, the wireline 240 will be raised and the perforating gun assembly 200 will be positioned at a new location (or "depth") along the horizontal portion 156. A plug (such as plug 112 of FIG. 1) is set below the perforating gun assembly 200 and new shots are fired in order to create a new set of perforations. Thereafter, treatment fluid is again pumped into the wellbore 100 and into the formation 115 at a pressure above the formation parting pressure. In this way, a second set of fractures is formed away from the wellbore 156.

The process of setting a plug, perforating the casing, and fracturing the formation is repeated in multiple stages until the wellbore 100 has been completed, that is, the wellbore 100 is ready for production. The shots create clusters of perforations to create fracture complexity and to enhance fluid communication with the formation 115. The result is that multiple plugs 112 are set along the horizontal wellbore 156 during the completion process.

In order to provide perforations for the multiple stages without having to pull the perforating gun after each detonation, the perforating gun assembly 200 employs multiple guns 210 in series. FIG. 2 is a side view of an illustrative perforating gun assembly 200, or at least a portion of an assembly. The perforating gun assembly 200 comprises a string of individual perforating guns 210.

Each perforating gun 210 represents various components. These typically include a "gun barrel" 212 which serves as an outer tubular housing. An uppermost gun barrel housing 212 is supported by an electric wire (or "e-line") 240 that extends from the surface 105 and that delivers electrical energy down to the perforating gun assembly 200. Each perforating gun 210 also includes an explosive initiator, or "detonator" (shown in phantom at 229).

In addition, each perforating gun 210 comprises a detonating cord (shown at 545 in FIG. 5A). The detonating cord 545 contains an explosive compound that is ignited by the detonator 229. Thus, the detonator 229 receives electrical energy which in turn initiates the detonator cord 545. The detonator cord 545 propagates an explosion down its length to a series of charges (typically referred to as shaped charges). In some cases, the shaped charges are held in an inner tube, referred to as a carrier tube, for security. The charges are discharged through openings 215 in the selected gun barrel 212. An illustrative charge carrier tube is shown at 500 of FIGS. 5 and 6A of co-owned U.S. Pat. No. 11,293,737, which is incorporated herein in its entirety by reference.

The perforating gun assembly 200 may include short centralizer subs 220. In addition, tandem subs 225 may be used to connect the gun barrel housings 212 end-to-end. Each tandem sub 225 comprises a metal threaded connector placed between the gun barrels 210. Typically, the gun barrel housings 212 will have female-by-female threaded ends (such as end 412 in FIG. 5B) while the tandem subs 225 have opposing male threaded ends.

Further, an insulated connection member 230 connects the e-line 240 to the uppermost gun barrel 210. The e-line 240 extends upward to a control interface (not shown) located at the surface 105.

The perforating gun assembly 200 and its long string of gun barrels (the housings 212 of the perforating guns 210) are carefully assembled at the surface 105, and then lowered into the wellbore 100 at the end of the e-line 240. After the casing 150 has been perforated and at least one plug 112 has been set, the setting tool 160 and the perforating gun assembly 200 are taken out of the wellbore 100, and a ball (not shown) is dropped into the wellbore 100 to close the plug 112. When the plug 112 is closed, a frac slurry (e.g., a mixture of water, sand, and surfactant) is pumped by a pumping system down the wellbore 100 for fracturing purposes. For a formation fracturing operation, the pumping system will create downhole pressure that is above the formation parting pressure.

It is observed that when the operator sends the detonation signals downhole, the directions to which the shots are fired into the formation cannot be controlled; instead, only the depth at which the shots are fired is controllable. In this respect, when the operator releases a perforating gun string into the wellbore 100, the perforating gun assembly 200 may (and likely will) rotate as it gravitationally falls into the wellbore 100. As the assembly 200 is pumped across the heel 153 and through the horizontal portion 156, additional rotational movement may occur. However, the operator may desire that shots be fired not only at selected depths, but also at a selected orientation about the central axis of a generally horizontal wellbore. Specifically, operators may prefer that the perforations be formed vertically upward (a 0° orientation) or downward (a 180° orientation) perpendicular from the central axis of the wellbore. Alternatively, operators may prefer that the perforations be formed laterally outward (90° or 270° orientation) from the central axis of the wellbore. This urges the fractures to propagate outwardly from the wellbore 100 in the direction of the perforations.

A need exists for an improved perforating gun assembly with orienting capability allowing perforations in any desired orientation from 0° to 360° about the central axis of the wellbore. Further, a need exists for an improved method of aligning charges along a perforating gun assembly for use in a wellbore. Still further, a need exists for a method of avoiding frac hits by shooting aligned perforations in a specific desired direction which may be away from a parent wellbore.

BRIEF SUMMARY OF THE INVENTION

A novel perforating gun assembly is first provided herein. The perforating gun assembly is arranged to enable the operator the ability to select the orientation in which shots may be fired downhole.

In one aspect, the perforating gun assembly first includes a gun barrel housing. The gun barrel housing has a first end, a second end, and a bore extending between the first and second ends. Thus, the gun barrel housing defines a tubular body.

The perforating gun assembly also includes a pair of tandem subs. Specifically, a tandem sub is placed at each of the opposing ends of the gun barrel housing. Each tandem sub has a pair of male threaded ends and a bore extending therein. The tandem subs are threadedly connected to the respective ends of adjacent gun barrel housings.

The perforating gun assembly also includes a rail system. The rail system resides within a gun barrel housing. The rail system comprises:
  a rail defining an elongated frame;
  a series of receptacles placed along the frame;
  a charge (such as a shaped charge) residing within each of the series of receptacles;
  a first ballast secured to a first end of the rail; and
  a second ballast secured to a second end of the rail.

Uniquely, the perforating gun system provides for a bearing connection. In this respect, a first bearing member resides at a distal end of the first ballast while a second bearing member resides at a distal end of the second ballast. Each ballast member engages and rotates within the bore of a respective tandem sub. Thus, when the perforating gun assembly is pumped into the horizontal leg of a wellbore, the ballasts will rotate into a downward position, placing the shaped charges into desired orientations.

Beneficially, the rail system may be used to support the charges in lieu of using a so-called "charger carrier tube." The charges may be inserted into the respective receptacles along the rail from either a forward side or a rearward side of the frame. Additionally, the ballasts may be connected to the rail at varying angles relative to the frame. In this way, shots may be fired within the horizontal section of a wellbore in a pre-selected orientation relative to the central axis of the wellbore.

A perforating gun system is also provided herein. The perforating gun system also includes a gun barrel housing. The gun barrel housing has a first end, a second end opposite the first end, and a bore extending from the first end to the second end of the gun barrel housing. Thus, the gun barrel housing defines a tubular body.

The perforating gun system also comprises a rail. The rail defines an elongated frame having a plurality of receptacles. Each receptacle is configured to receive a charge (such as a shaped charge). Each of the shaped charges may be received within a respective receptacle from either side of the frame. In this way, the charges may face opposite directions relative to each other within the wellbore, or they may all face in the same direction.

In one aspect, the rail comprises one to five receptacles, meaning one to five charges are received. Preferably, the rail is fabricated from aluminum, an aluminum alloy, or a rigid polymeric material. In one aspect, two rails can be connected end-to-end, effectively forming one longer rail with additional receptacles.

A first flange resides at a first end of the rail. Similarly, a second flange resides at a second end of the rail. Each flange includes a plurality of through-openings spaced equi-radially around a perimeter.

The perforating gun system also includes a pair of tandem subs. A first tandem sub is threadedly connected to the first end of the gun barrel housing, while a second tandem sub is threadedly connected to the second end of the gun barrel housing. Each of the first and second tandem subs comprises a first end, a second end opposite the first end, and a bore extending from the first end to the second end.

Preferably, each of the first tandem sub and the second tandem sub comprises male threaded ends. At the same time, the first and second opposing ends of the gun barrel housing each comprises female threads, forming a female-by-female tubular body. In one aspect, each tandem sub houses an addressable switch.

Additionally, the perforating gun system includes a pair of ballasts. These represent a first ballast and a second ballast. Each of the first and second ballasts comprises a weighted body. The first ballast comprises a proximal end connected to the first flange, and a distal end bearingly abutting the first tandem sub. At the same time, the second ballast comprises a proximal end connected to the second flange, and a distal end bearingly abutting the second tandem sub. The weighted bodies reside between the proximal and distal ends of each of the ballasts.

The perforating gun system takes advantage of a pair of bearing connections. In this respect, the system offers a first bearing member supported by the first ballast at the distal end of the first ballast. The system then offers a second bearing member supported by the second ballast at its distal end. The first bearing member interfaces with and rotates within the bore of the first tandem sub, while the second bearing member interfaces with and rotates within the bore of the second tandem sub. The result of these interfaces is that the perforating gun system allows for relative rotation between the ballasts and the first and second tandem subs. This, in turn, allows for relative rotation of the rail and supported shaped charges within the gun barrel housing.

The shaped charges may be placed within respective receptacles along the frame to fire at orientations of any of 0 degrees, 90 degrees, 180 degrees, or 270 degrees within the horizontal wellbore, depending on the direction in which the charges are inserted into the respective receptacles, depending on the angle at which the ballasts are secured to the flanges of the rail. Intermediate angles (such as at 45 degree angles) may be selected at the operator's preference.

In one aspect, a first electrically conductive contact pin resides within the bore of the first tandem sub. Similarly, a second electrically conductive contact pin resides within the bore of the second tandem sub. A detonator resides within the gun barrel housing adjacent the rail and is in electrical communication with the contact pins.

A method of orienting shots in a perforating gun assembly is also provided herein. In one aspect, the method first comprises providing a perforating gun assembly. The perforating gun assembly may be arranged in accordance with any of the embodiments described above. In this respect, the perforating gun assembly includes a gun barrel housing and a pair of tandem subs. Specifically, a tandem sub is placed at each of the opposing ends of the gun barrel housing.

The method also includes providing a rail. The rail defines an elongated frame having a series of receptacles along its length. The receptacles are configured to receive respective charges. Preferably, the receptacles each have a circular profile and are equi-distantly spaced along the frame.

The method further comprises placing a charge within each of the respective receptacles along the frame. Preferably, the rail includes at least three receptacles. Beneficially, the charges may be received within a respective receptacle from either side of the frame.

The method additionally comprises threadedly connecting the first tandem sub to the first end of the gun barrel housing. The method then includes threadedly connecting the second tandem sub to the second end of the gun barrel housing.

The perforating gun system includes a pair of ballasts. These represent a first ballast and a second ballast. Each of the first and second ballasts comprises a weighted body. The first ballast comprises a distal end abutting the first tandem sub. At the same time, the second ballast comprises a distal end abutting the second tandem sub.

The method also comprises providing a first bearing connection between the first ballast and the first tandem sub. Additionally, the method comprises providing a second bearing connection between the second ballast and the second tandem sub. In this way, the first ballast, the second ballast, and the connected rail may rotate together relative to the first and second tandem subs and the connected gun barrel housing.

In one aspect, each of the first and second tandem subs comprises a first end and a second end opposite the first end. Each of the first and second tandem subs further comprises a bore extending from the first end to the second end of the respective tandem sub. The first bearing member interfaces with and rotates within the bore of the first tandem sub, while the second bearing member interfaces with and rotates within the bore of the second tandem sub. This allows for the relative rotation between the rail and the first and second tandem subs.

In one embodiment, the method also includes placing each of the shaped charges into respective charge jackets. Each charge jacket is fabricated from a compliant material, allowing the charges to be removably snapped into place. The rail further comprises slots associated with each of the receptacles. Each of the charge jackets comprises side rails configured to be received within the slots of a respective receptacle along the frame. In this way, the shaped charges are held securely in position along the frame.

The method may also include selecting a direction for each of the shaped charges within its respective receptacle along the frame. The method then includes connecting the proximal end of the first ballast to the first end of the rail, and connecting the proximal end of the second ballast to the second end of the rail.

In one embodiment, the rail comprises a first end defining a first flange, and a second end defining a second flange. The first flange comprises at least four equi-radially spaced through-openings. Similarly, the second flange also comprises at least four equi-radially spaced through-openings. The proximal end of the first ballast comprises a pair of through-openings that may be aligned with a selected pair of the at least four equi-radially spaced through-openings of the first flange. At the same time, the proximal end of the second ballast comprises a pair of through-openings that may be aligned with a selected pair of the at least four equi-radially spaced through-openings of the second flange. In this arrangement, connecting the proximal end of the first ballast to the first end of the rail, and connecting the proximal end of the second ballast to the second end of the rail, comprises:

(i) placing first connectors through aligned through-openings between the proximal end of the first ballast and the first end of the rail (or first flange); and (ii) placing second connectors through aligned through-openings between the proximal end of the second ballast and the second end of the rail (or second flange).

In one aspect, the method comprises determining which of the through-openings of the first and second flanges that the connectors are to be placed. This determines the relative angle between the weighted bodies of the ballasts and the rail and supported charges. In this way, when the first and second ballasts and the connected rail rotate within a horizontal portion of a wellbore, the charges can be fired downhole at a desired (or pre-selected) orientation.

In one aspect, the charges may be placed within respective receptacles along the frame to fire at orientations of any of 0 degrees, 90 degrees, 180 degrees, or 270 degrees within a horizontal wellbore, depending on the direction in which the charges are inserted into the respective receptacles and the angle at which the ballasts are secured to the rail.

In one aspect, a first electrically conductive contact pin resides within the bore of the first tandem sub. Similarly, a second electrically conductive contact pin resides within the bore of the second tandem sub. A detonator resides within the gun barrel housing adjacent the rail and is in electrical communication with the first and/or second contact pins.

The method may also include the steps of:
running the perforating gun assembly into a wellbore at the end of an electric wireline;
pumping the perforating gun assembly into a horizontal portion of the wellbore; and
allowing the weighted body of the first ballast and the weighted body of the second body to rotate into a downward position, thereby placing the shaped charges into the pre-selected orientation relative to the wellbore.

A bearing member assembly is also provided herein. The bearing member assembly is intended to be used in a wellbore completion operation such a casing perforation operation.

In one embodiment, the bearing member assembly first comprises a tubular sub. Preferably, the tubular sub is a tandem sub connected to a gun barrel housing. The tubular sub has a first end, and a second end opposite the first end. Connection threads are placed at each of the first and second ends.

An internal bore resides within the tubular sub. The internal bore extends from the first end to the second end. A tapered shoulder is formed along the internal bore at the second end. The tapered shoulder defines an angle relative to the central axis of the internal bore.

The bearing member assembly also comprises a bearing member. The bearing member includes a tubular support body. The tubular support body has an inner diameter forming a bore, and an outer diameter forming a race. A plurality of roller bearings are disposed along the race. The roller bearings reside at an angle that corresponds with the angle of the tapered shoulder of the tubular sub.

A housing is provided to hold the plurality of roller bearings against the race. In this way, the housing serves as a cage. The housing has a frusto-conical profile that corresponds to the angle of the tapered shoulder. The housing comprises a plurality of equi-distantly spaced windows, with each window receiving a respective roller bearing.

In one embodiment, the bearing member assembly also includes a connector housing. The connector housing has a first end, a second end opposite the first end. The connector housing also has a bore residing within the connector housing. The connector housing is fabricated from a non-conductive material. Of interest, the first end of the connector housing extends into the internal bore of the tubular sub. In this embodiment, the bearing member resides between the tapered shoulder of the internal bore of the tubular sub and the connector housing.

In one aspect, a conductive pin resides within the internal bore of the tubular sub. The conductive pin is in electrical communication with a signal line, and is configured to receive a detonation signal from the surface that is sent through the signal line A method of grounding a perforating gun assembly is also provided herein. In one embodiment, the method first comprises providing a perforating gun assembly. The perforating gun assembly comprises a gun barrel housing having a first end, a second end opposite the first end. The gun barrel housing also has a bore extending from the first end to the second end.

The perforating gun assembly also includes an explosive charge holder. The explosive charge holder comprises at least one, and preferably at least three, receptacles. Each receptacle is configured to receive an explosive charge. Preferably, the explosive charge receptacle is the rail having the elongated frame described above.

The perforating gun assembly further comprises a detonator. The detonator is ignited by an electrical signal sent from the surface. Alternatively, the detonator is secured to a detonating cord, which in turn is secured to the set of the respective charges in the explosive charge holder.

The method also includes threadedly connecting a tandem sub to the gun barrel housing at the second end of the gun barrel housing. The tandem sub may be designed in accordance with the tandem sub described above in its various embodiments. For example, the tandem sub may comprise a steel body having a first end, and a second end opposite the first end. An internal bore is preserved within the steel body extending from the first end to the second end.

The tandem sub includes a tapered shoulder along the internal bore proximate the second end. The tapered shoulder defines an angle relative to the central axis of the internal bore. In one aspect, the tapered shoulder is provided as part of a short end cap screwed onto or otherwise attached to the second end of the tandem sub. In another aspect, the tapered shoulder is provided as an insert that is screwed or press fit into the second end of the tandem sub.

The method additionally comprises:
providing a bearing member along the tapered shoulder of the internal bore of the tubular sub;
operatively connecting the bearing member to the explosive charge holder;
placing an electrically conductive member within or abutting the tubular support body of the bearing member; and
placing the bearing member in contact with the tapered shoulder of the internal bore of the tandem sub such that the bearing member is electrically grounded with the steel body of the tandem sub.

Ideally, electrically grounding the bearing member with the steel body of the tandem sub also grounds the bearing member with the gun barrel housing.

The method may further comprise placing an explosive charge within each of the respective receptacles along the elongated frame.

BRIEF DESCRIPTION OF THE DRAWINGS

So that the manner in which the present inventions can be better understood, certain illustrations, charts, and/or flow charts are appended hereto. It is to be noted, however, that the drawings illustrate only selected embodiments of the inventions and are therefore not to be considered limiting of scope, for the inventions may admit to other equally effective embodiments and applications.

FIG. 10A is a cross-sectional view of the tandem sub of the present invention in a first embodiment.

FIG. 10B is a cross-sectional view of the tandem sub of the present invention in a second embodiment. Here, the bearing member is integral to the tandem sub.

FIG. 10C is an enlarged view of an end of the tandem sub of FIG. 10B.

DETAILED DESCRIPTION OF CERTAIN EMBODIMENTS

Definitions

Figure 1:
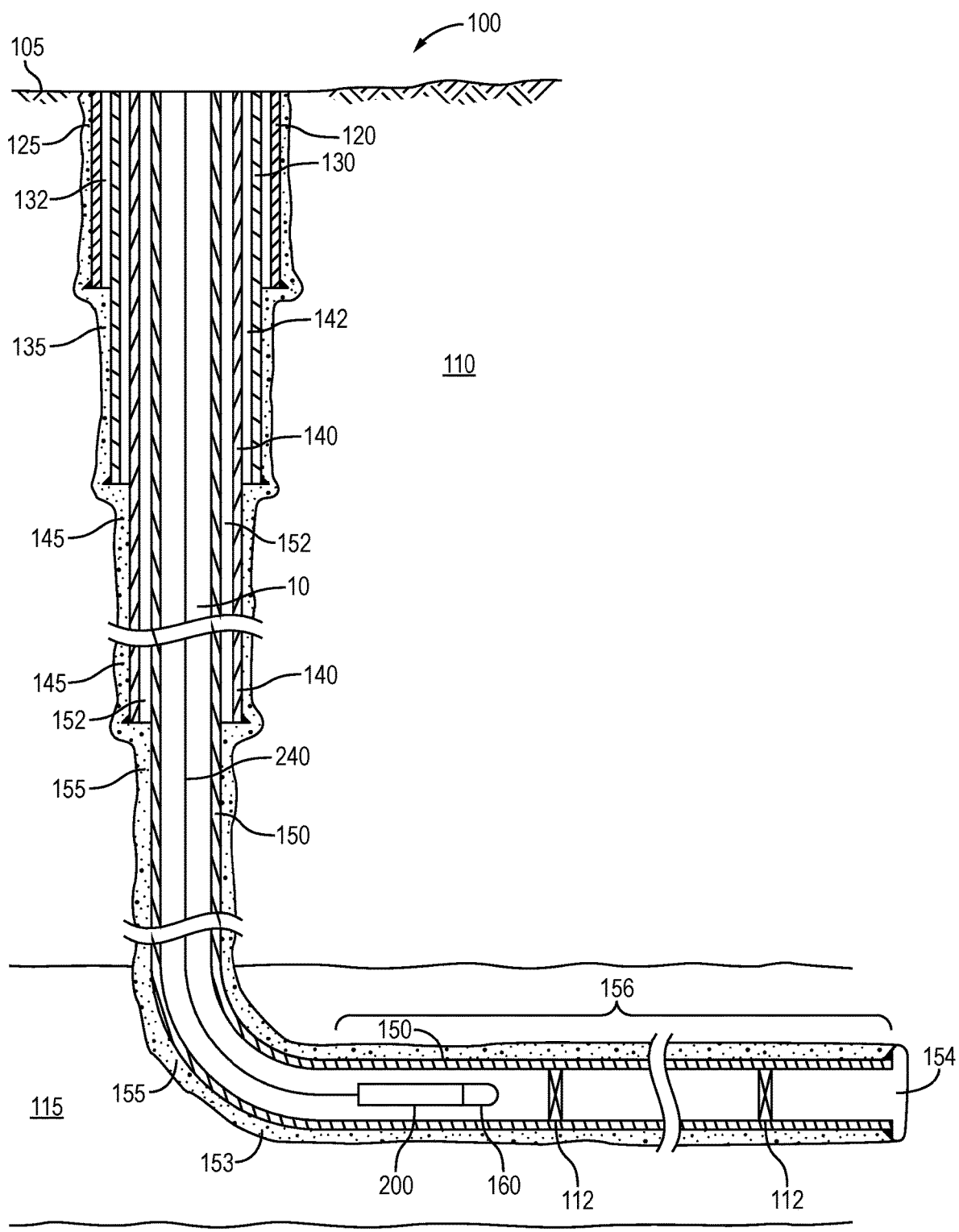
FIG. 1 is a side, cross-sectional view of a wellbore, in one embodiment. The wellbore has been completed with an elongated horizontal section. A perforating gun assembly is shown having been pumped into the horizontal section, or leg, at the end of an e-line.
Figure 2:
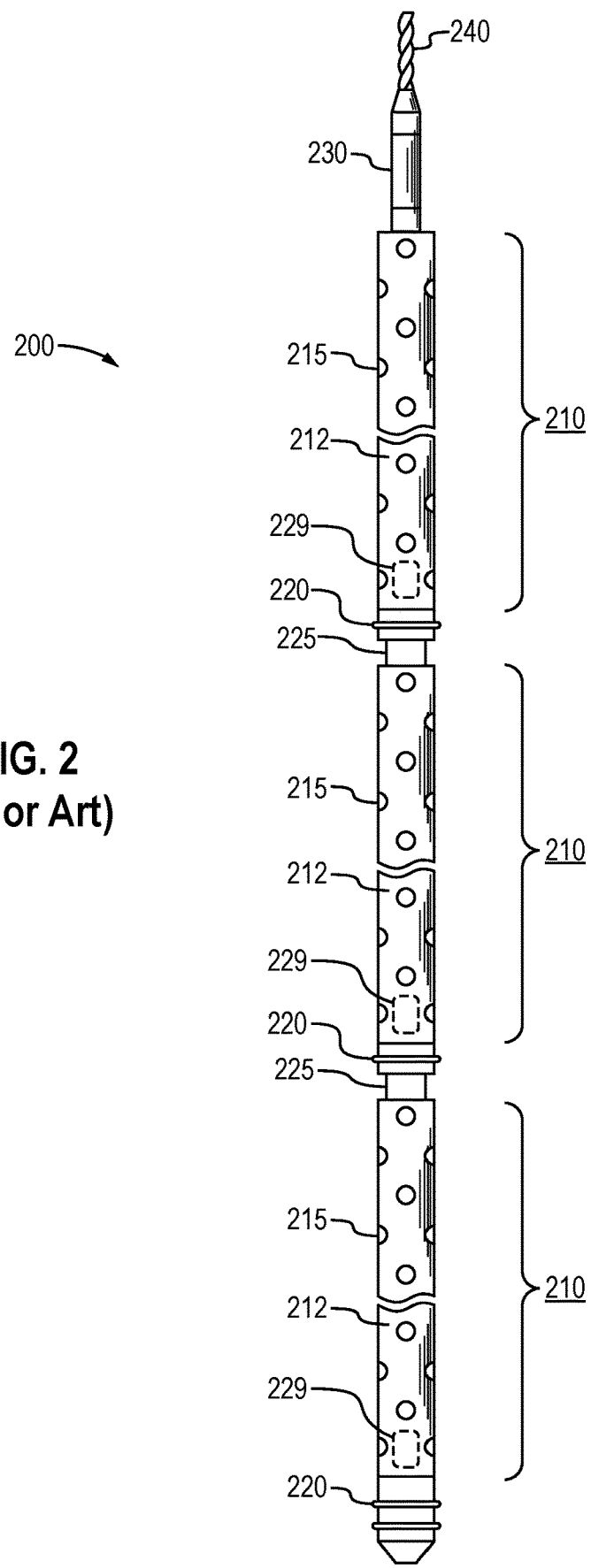
FIG. 2 is a side view of an illustrative string of gun barrels forming a perforating gun assembly. The perforating gun assembly represents a series of perforating guns having been threadedly connected end-to-end. Tandem subs are shown between gun barrel housings of the perforating guns, providing the threaded connections.

For purposes of the present application, it will be understood that the term "hydrocarbon" refers to an organic compound that includes primarily, if not exclusively, the elements hydrogen and carbon. Hydrocarbons may also include other elements, such as, but not limited to, halogens, metallic elements, nitrogen, carbon dioxide, and/or sulfuric components such as hydrogen sulfide.

As used herein, the terms "produced fluids," "reservoir fluids," and "production fluids" refer to liquids and/or gases removed from a subsurface formation, including, for example, an organic-rich rock formation. Produced fluids may include both hydrocarbon fluids and non-hydrocarbon fluids. Production fluids may include, but are not limited to, oil, natural gas, pyrolyzed shale oil, synthesis gas, a pyrolysis product of coal, nitrogen, carbon dioxide, hydrogen sulfide and brine.

As used herein, the term "fluid" refers to gases, liquids, and combinations of gases and liquids, as well as to combinations of gases and solids, combinations of liquids and solids, and combinations of gases, liquids, and solids as a slurry.

As used herein, the term "surface" refers to a location on the earth's surface. The surface may be a land surface or a water surface.

As used herein, the term "subsurface" refers to geologic strata occurring below the earth's surface.

As used herein, the term "formation" refers to any definable subsurface region regardless of size. The formation may contain one or more hydrocarbon-containing layers, one or more non-hydrocarbon containing layers, an overburden, and/or an underburden of any geologic formation. A formation can refer to a single set of related geologic strata of a specific rock type, or to a set of geologic strata of different rock types that contribute to or are encountered in, for example, without limitation: (i) the creation, generation, and/or entrapment of hydrocarbons or minerals; and (ii) the execution of processes used to extract hydrocarbons or minerals from the subsurface region.

As used herein, the term "wellbore" refers to a hole in the subsurface made by drilling or insertion of a conduit into the subsurface. A wellbore may have a substantially circular cross-section, or other cross-sectional shape. The term "well," when referring to an opening in the formation, may be used interchangeably with the term "wellbore." A wellbore may be formed for the purpose of producing hydrocarbon fluids. Alternatively, a wellbore may be completed for the purpose of producing steam in connection with a geothermal project.

The terms "upstream" and "downstream" may be used to indicate the relative position of tools or components within a wellbore.

As used herein, the term "sub" generally refers to a cylindrical body. The sub may have opposing threaded ends and is used to connect tubular bodies in series.

Reference herein to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment.

Description of Selected Specific Embodiments

The following description of the embodiments refers to the accompanying drawings. The same reference numbers in different drawings identify the same or similar elements.

The following detailed description does not limit the invention. Instead, the scope of the invention is defined by the appended claims.

Figure 3A:
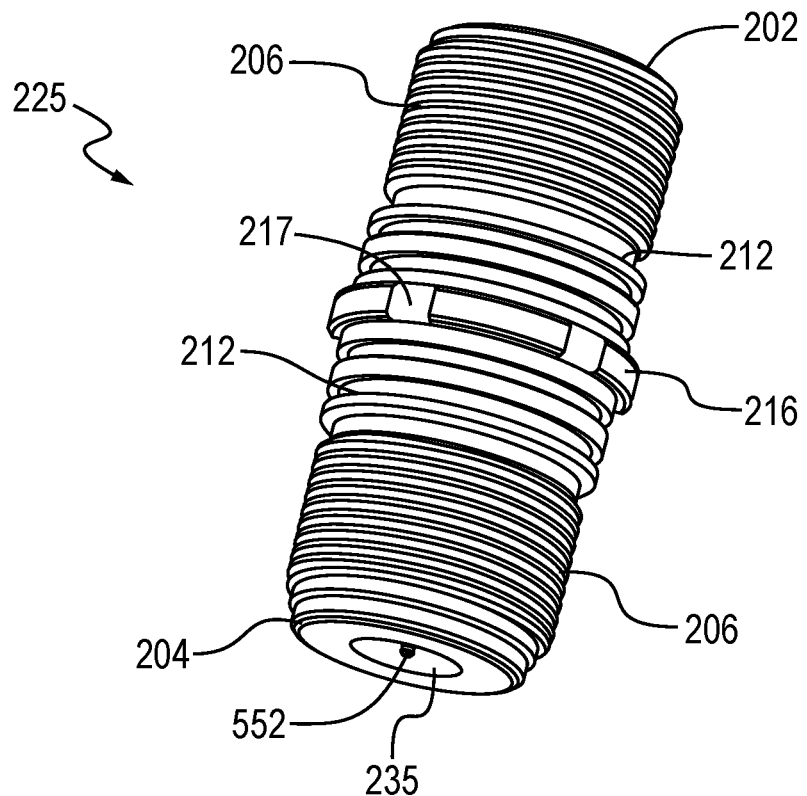
FIG. 3A is a first perspective view of a tandem sub as may be used in the string of gun barrels of FIG. 2A.
Figure 3B:
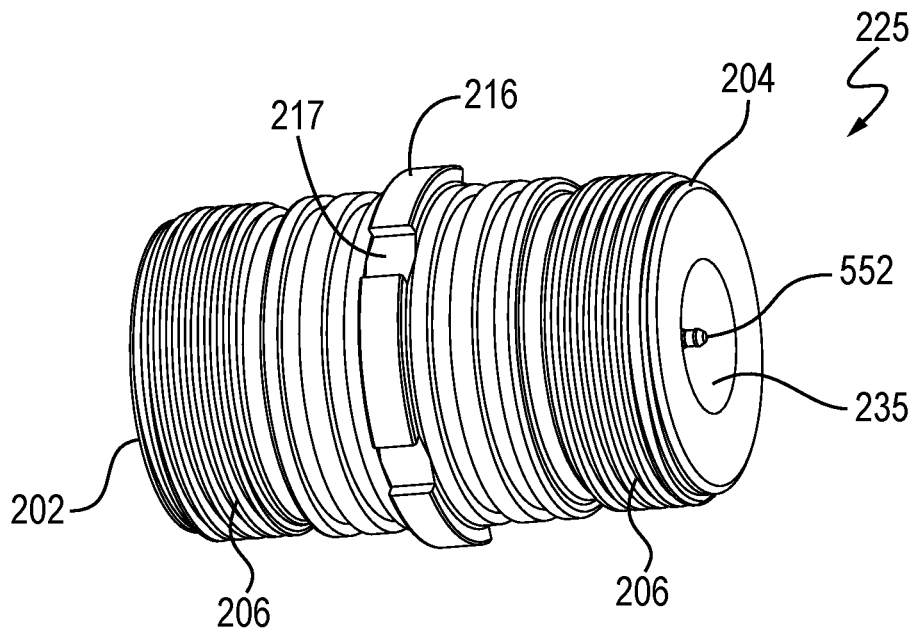
FIG. 3B is a second perspective view of the tandem sub of FIG. 3A.

FIG. 3A is a first perspective view of an illustrative tandem sub 225. FIG. 3B is a second perspective view of the same tandem sub 225. The tandem sub 225 will be described with reference to FIGS. 3A and 3B together.

The tandem sub 225 defines a short tubular body having a first end 202 and a second opposing end 204. The tandem sub 225 may be, for example, 1.00 inches to 5.5 inches in length, with the two ends 202, 204 being mirror images of one another. Preferably, the tubular body forming the tandem sub 225 is portless.

The tandem sub 225 includes externally machined threads 206. The threads 206 are male threads dimensioned to mate with female threaded ends of a gun barrel housing. A gun barrel housing is shown at 410 in FIG. 4B. The tandem sub 225 is preferably dimensioned in accordance with standard 3-⅛" gun components. This allows the tandem sub 225 to be threadedly connected in series with perforating guns from any American vendor, e.g., Geo-Dynamics® and Titan®.

Intermediate the length of the tandem sub 225 and between the threads 206 is a shoulder 216. The shoulder 216 serves as a stop member as the tandem sub 225 is screwed into an end 412 or 414 of a gun barrel housing 410. Stated another way, the shoulder 216 serves as a limiter to the tightening of the tandem sub 225 onto the gun barrel housing 410. Optionally, grooves 217 are formed equi-radially around the shoulder 216. The grooves 217 removably engage with a tool (not shown) used for applying a rotational force to the tandem sub 225 without harming the rugosity of the shoulder 216. U.S. Pat. No. 11,559,875 describes a socket driver that may be used to connect the tandem sub 225 to a gun barrel housing 212 or 410. The '875 patent is titled "Socket Driver, and Method of Connecting Perforating Guns" and is incorporated herein by reference in its entirety.

The tandem sub 225 includes a central bore 235. As will be described in greater detail below, the bore 235 is dimensioned to receive a bulkhead (seen at 475 of FIG. 5B). The bulkhead 475, in turn, supports a contact pin (shown at 550, also in FIG. 5B). An upstream end of the contact pin 550 is seen at 552 in FIG. 3B.

The contact pin 550 defines an elongated body that is fabricated from brass or a metal alloy comprised at least partially of brass. Thus, the contact pin 550 is electrically conductive.

Circular grooves 212 are formed along the tandem sub 225. Specifically, a pair of circular grooves 212 is provided on opposing sides of the shoulder 216. The grooves 212 are dimensioned and configured to receive respective O-rings (not shown). The O-rings preferably define elastomeric seals that closely fit between an outer diameter of the tandem sub 225 and an inner diameter of the surrounding gun barrel housing 410. The O-rings provide a pressure seal for the gun barrel housing 410 when in the wellbore and prior to charges 540', 540" being detonated.

It is noted that the large O-rings on the O.D. of the tandem sub 225 protect the interior of the barrel (charges, wires, etc.) from wellbore fluid/pressure. Once the charges go off, the interior of the barrel floods. The bulkhead 475 and O-rings on the bulkhead 475 protect the upstream gun from flooding when the gun below is flooded from firing.

Figure 4A:
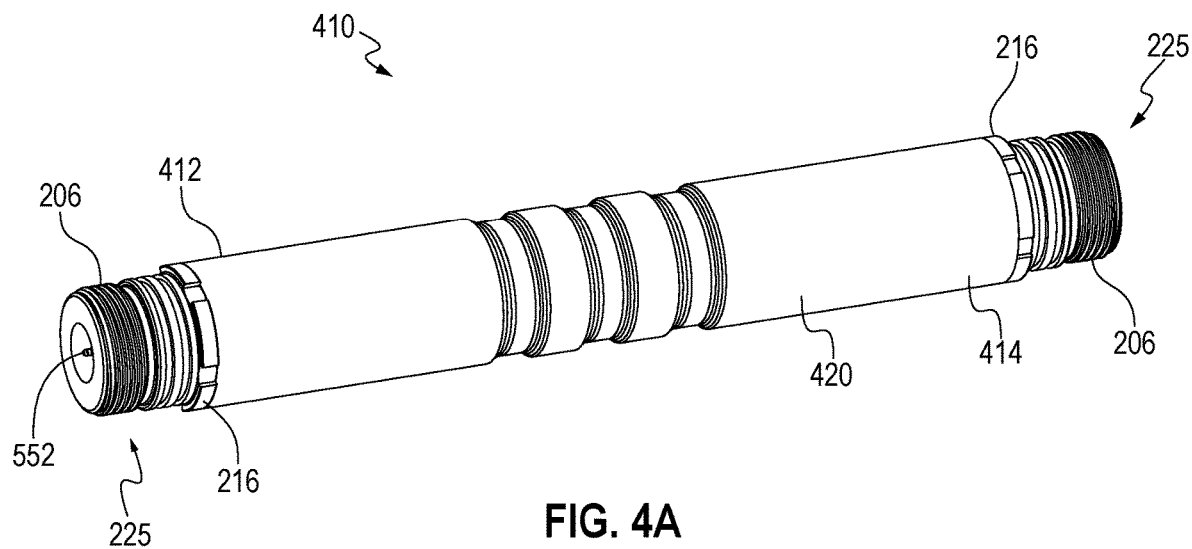
FIG. 4A is a perspective view of a gun barrel housing as may be used in the perforating gun assembly of the present invention, in one embodiment. The gun barrel housing is straddled by opposing tandem subs.

FIG. 4A is a perspective view of a gun barrel housing 410. The gun barrel housing 410 defines a tubular body 420, preferably fabricated from steel. The tubular body 420 has a first end 412, and a second end 414 opposite the first end 412. In the view of FIG. 4A, tandem subs 225 have been screwed into each of the opposing ends 412, 414 of the gun barrel housing 410.

The gun barrel housing 410 is dimensioned to house components of any known perforating gun. Such components include a detonator and a detonator cord (shown in FIG. 5A at 560 and 545.) In addition, the gun barrel housing 410 will house a set of explosive charges 540', 540" used to form perforations into the surrounding gun barrel housing 410 and extending out into the surrounding formation 115. Uniquely, and as described further below in connection with FIGS. 5A, 5B, 6A, 6B, and 6C, the gun barrel housing 410 does not contain a carrier tube; instead, a novel rail system 600 is employed to support the individual charges 540', 540". The charges 540', 540" are detonated by the detonator cord 545 at a pre-determined orientation.

Figure 4B:
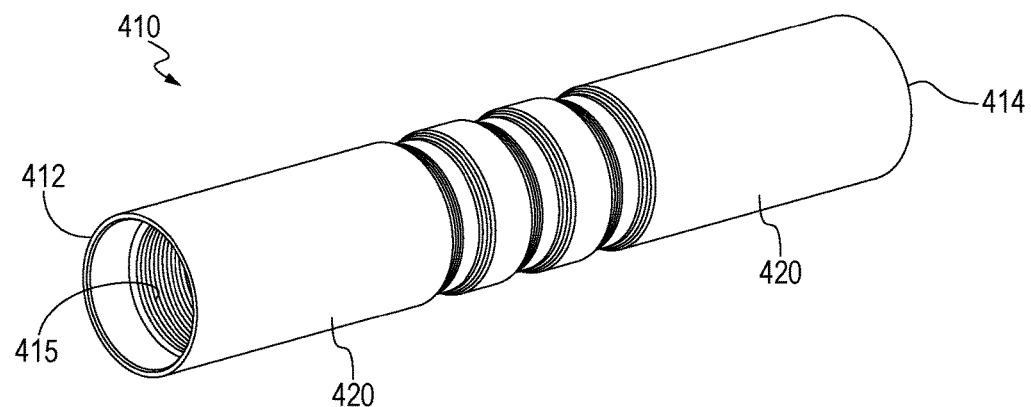
FIG. 4B is a perspective view of the gun barrel housing of FIG. 4A. The tandem subs have been removed for illustrative purposes.

FIG. 4B is a perspective view of the gun barrel housing 410 of FIG. 4A. Here, the tandem subs 225 and internal components have been removed for illustrative purposes. It is understood that a series of gun barrel housings 410 will be threadedly connected together using the tandem subs 225 of FIG. 4A. Each gun barrel housing 410 will contain a means for transmitting a detonation signal along with electronics for processing those signals.

It is noted that in FIGS. 4A and 4B, the gun barrel housing 410 has both the first end 412 and the second end 414. When placed in a wellbore 100, the first end 412 represents an upstream end, while the second end 414 represents a downstream end. It is understood that in "oil patch" parlance, a left end of a tool represents the upstream end while a right end of a tool represents the downstream end. In practice, a perforating gun string will include a series of perforating gun assemblies (shown at 400 in FIG. 5A) each of which may be between 8 inches and 3 feet in length.

Figure 5A:
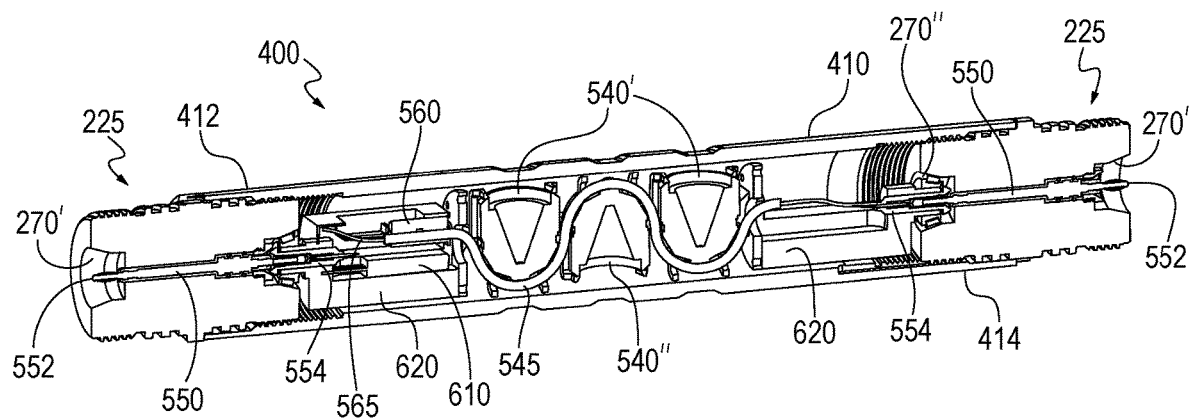
FIG. 5A is a cut-away view of the gun barrel housing of FIG. 4A. Tandem subs are again seen at opposing ends of the gun barrel housing. Various components of a perforating gun assembly are seen within the gun barrel housing including a rail for supporting shaped charges.

FIG. 5A is a cut-away view of the gun barrel housing 410 of FIG. 4A. Tandem subs 225 are again seen at opposing ends 412, 414 of the gun barrel housing 410. In addition, contact pins 550 are visible within the respective tandem subs 225. The tandem subs 225 are threaded into the bore 415 of the gun barrel housing 410. A distal end 552 of each contact pin 550 extends into a first conical opening 270 of the corresponding tandem sub 225. At the same time, a proximal end 554 of each contact pin 550 extends through a second conical opening 270" of the tandem sub 225, and then into the bore 415 of the gun barrel housing 410. Together, internal components contained within the gun barrel housing 410 comprise elements of the perforating gun assembly 400.

Figure 5B:
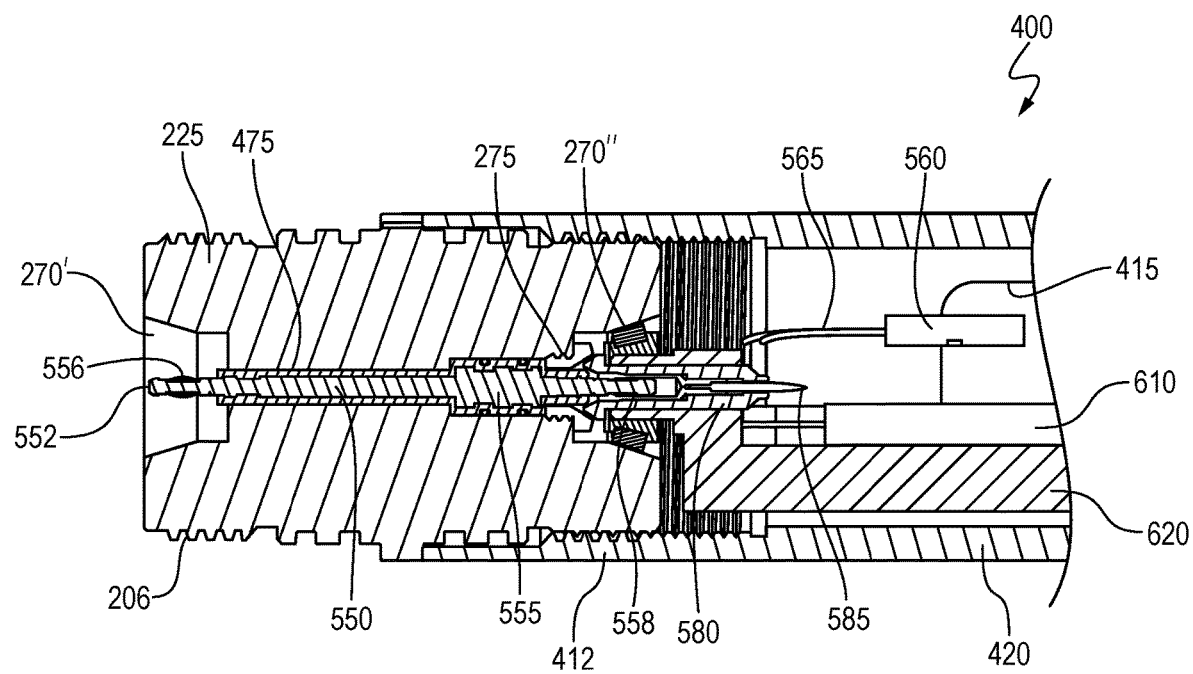
FIG. 5B is an enlarged, cross-sectional view of an end of the perforating gun assembly of FIG. 5A. A contact pin is seen extending through the tandem sub. In addition, a bearing connection is shown between the tandem sub and a ballast.

FIG. 5B is an enlarged view of the end 412 of the gun barrel housing 410 of FIG. 5A. Here, one of the contact pins 550 is more visible. Particularly, it can be seen that the distal end 552 of the contact pin 550 terminates within the first conical (or angled) openings 270' of the tandem sub 225. As shown more fully in FIG. 7, the distal end 552 of the contact pin 550 may optionally support a banana terminal 556. The banana terminal 556 is configured to provide electrical communication with an upstream signal transmission wire (not shown). It is understood that the signal transmission wire travels down from an upstream gun barrel housing and is itself in electrical communication with the e-line 240.

It is believed that the banana terminal 556 arrangement provides better electrical connectivity than the so-called "pin-on-seat" arrangement used in many perforating gun systems today. The pin-on-seat arrangement relies on a spring-loaded connection that may not always function properly. In the current electrical system, a small brass female banana plug 558 resides within a connector housing 580. A wire 585 is then crimped or soldered to the banana plug terminal 558.

The contact pin 550 resides within a bulkhead 475. The contact pin 550 includes an enlarged outer diameter portion 555. The enlarged outer diameter portion 555 is arranged with a series of grooves machined into its profile. The grooves (not numbered) cooperate with mating grooves (also not numbered) along an inner diameter of the bulkhead 475. Such an arrangement is described in greater detail in co-owned U.S. Pat. No. 10,914,145 which is incorporated herein in its entirety by reference.

Figure 7:
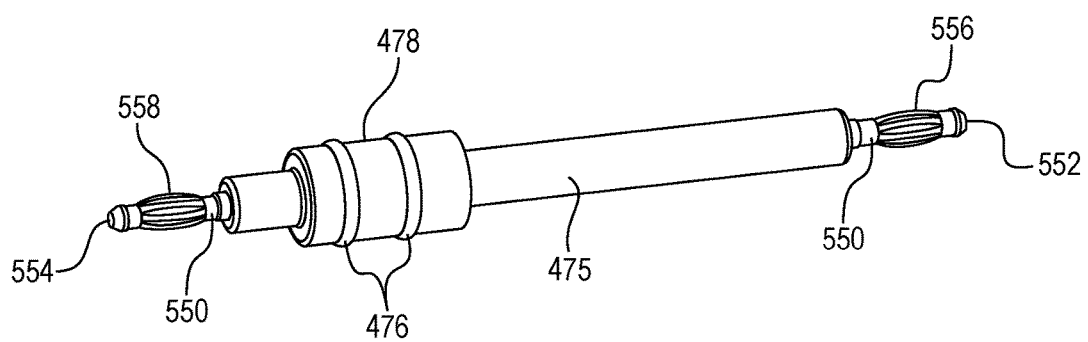
FIG. 7 is a perspective view of a bulkhead. The bulkhead houses an elongated contact pin. Banana clips are shown at opposing ends of the contact pin.

Skipping over to FIG. 7, FIG. 7 is a perspective view of the bulkhead 475. The bulkhead 475 houses the elongated contact pin 550. The contact pin 550 can be seen extending out of opposite ends of the bulkhead 475. Banana plugs 556, 558 are shown at opposing ends 552, 554 of the contact pin 550. Specifically, banana plug 556 is at the upstream end 552 while banana plug 558 is at the downstream end 554. It is noted that the bulkhead 475 of FIG. 7 is presented in a reverse orientation from how it is presented in FIG. 5B. However, the same bulkhead 475 is shown in both FIGS. 7 and 5B.

The bulkhead 475 includes a portion 478 having an enlarged inner diameter. This portion 478 accommodates the corresponding enlarged outer diameter portion 555 of the contact pin 550. O-rings 476 are shown along the outer diameter of the enlarged inner diameter portion 478. The O-rings 476 and the enlarged inner diameter portion 478 limit the transmission of fluid and pressure when a downstream perforating gun is detonated.

Returning to FIG. 5B, a castle nut 275 is placed around the contact pin 550 at the downstream end (this is end 554 that extends into the bore 415 of the gun barrel housing 410 as seen in FIG. 5A). The threaded castle nut 275 holds the bulkhead 475 in the tandem sub 225 and in turn holds the contact pin 550 within the bore of the bulkhead 475 during assembly of the perforating gun assembly 400.

Below the snap ring 275 is a connector housing 580. The connector housing 580 secures a wire 585 extending from the female banana plug terminal 558 and into the gun barrel housing 410. The wire 585 serves as a signal transmission wire, transmitting detonation signals to perforating gun assemblies 400 downhole, from gun-to-gun. Those of ordinary skill in the art will understand that addressable switches 610 residing along the gun barrel housings 418 will watch for a detonation signal addressed to a particular perforating gun assembly 400, causing a detonation signal to be sent into a detonator wire. Thus, the wire 585 from the banana plug terminal 558 extends to the addressable switch.

It is noted that wire 585 connects to the addressable switch 610. The addressable switch 610, in turn, connects to a detonator 560 as well as a wire on the female banana plug at an opposing end of the rail/ballast assembly.

In FIG. 5B, a detonator wire is shown at 565. The detonator wire 565 extends into the detonator 560. In actuality, the detonator wire 565 is actually a pair of wires 565P, 565N shown in FIG. 13A. When the detonator 560 is activated, a controlled explosion takes place that ignites a detonator cord (shown at 545 in FIG. 5A). The detonator cord 545, in turn, ignites sets of the shaped charges 540', 540" within the gun barrel housing 410.

It is observed that in FIG. 5A, three shaped charges 540', 540" are shown. Two outer charges 540' are oriented in a first direction while a middle charge 540" is oriented in a direction that is rotated by 180 degrees relative to the charges 540'. Directing charges within a gun barrel housing 410 in two different orientations allows the operator to shoot charges into the surrounding formation 115 in opposite directions.

In the typical carrier tube arrangement, charges are spaced apart radially and longitudinally along a tubular body. This allows shots to be fired in all radial directions through the production casing 150. However, in the arrangement of FIGS. 5A and 6A, charges 540', 540" are intentionally aligned at nominally 180 degree relation. This allows the operator to shoot charges horizontally from the wellbore 100 once the perforating gun assemblies 400 are in a horizontal position and the rails (see rail 630 in FIG. 6B) rotate into place.

As noted above, it is also desirable to be able to control the orientation at which the shots are fired from the perforating gun assembly 400. To enable the operator to direct the orientation of the shots fired from the charges 540', 540", a novel rail system is provided herein. The rail system is shown at 600 and described in connection with FIGS. 6A and 6B. Generally, the rail system 600 comprises a rail 630, and ballast members 620 which reside at opposing ends of the rail 630. As will be discussed further below, the rail system 600 allows the charges 540', 540" to freely rotate within the horizontal portion 156 of the wellbore 100, placing the charges 540', 540" into a predetermined orientation.

Figure 6A:
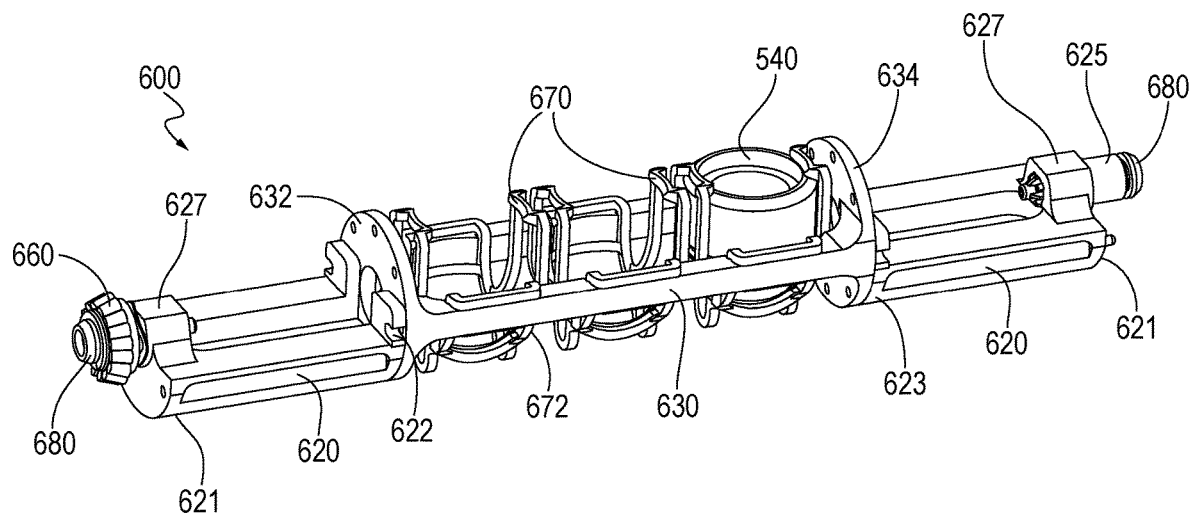
FIG. 6A is a first perspective view of rail system which resides within the gun barrel housing of FIGS. 4B and 5A. A rail is seen between opposing ballasts. In this view, each shot is to be oriented at an orientation of 0 degrees.

FIG. 6A is a first perspective view of the rail system 600. The rail system 600 is configured to reside within the gun barrel housing 410 of FIGS. 4B and 5A. In this view, each shot 540 is oriented at 0 degrees. (Note that for illustrative purposes only one of three shots is shown in FIG. 6A.)

Figure 8A:
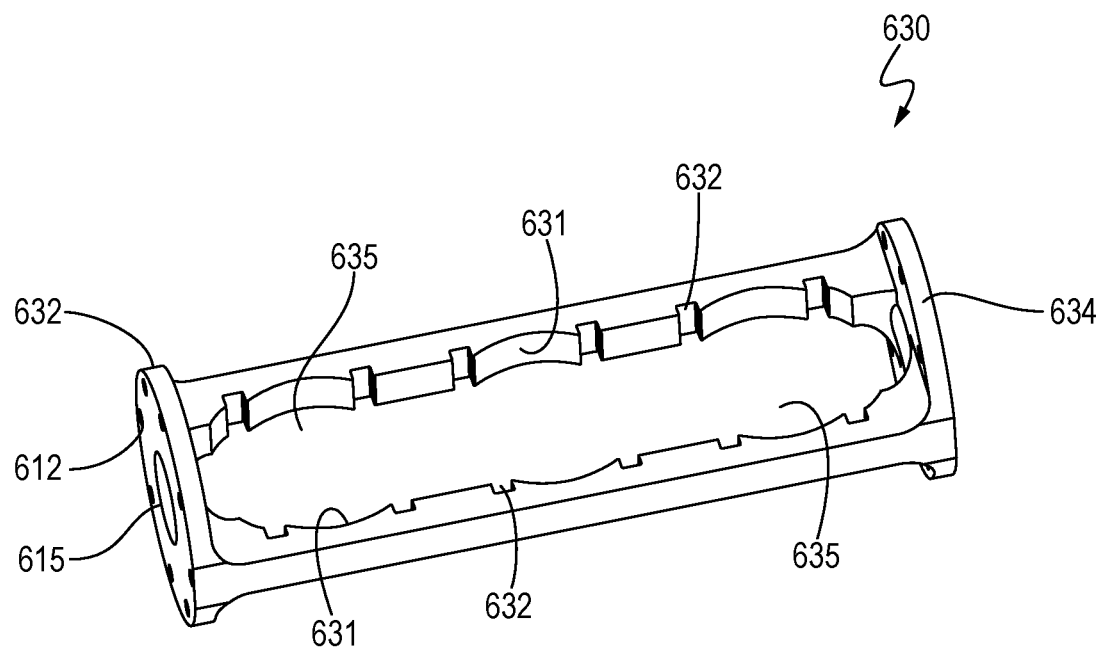
FIG. 8A is a perspective view of the rail used in the perforating gun assembly of FIG. 5A. The rail is dimensioned to hold a series of charge jackets, which in turn secure respective charges.

FIG. 8A is a perspective view of the rail 630 used in the perforating gun assembly 400 of FIG. 5A. The rail 630 defines an elongated frame that is dimensioned to hold a series of charge jackets (shown at 670 in FIGS. 6A and 8B). The charge jackets 670, in turn, secure respective charges 540. Preferably, the rail 630 is fabricated from either cast aluminum or an aluminum alloy so as to be conductive along a grounding path. Alternatively, the rail 630 may be fabricated from a rigid polymeric material.

The rail 630 has a first end 632 and a second end 634 opposite the first end 632. Each end 632, 634 represents a circular member, or flange, having a plurality of equi-radially positioned through-openings 612. Preferably, each end 632, 634 comprises at least four, and more preferably eight, through-openings 612.

Figure 9A:
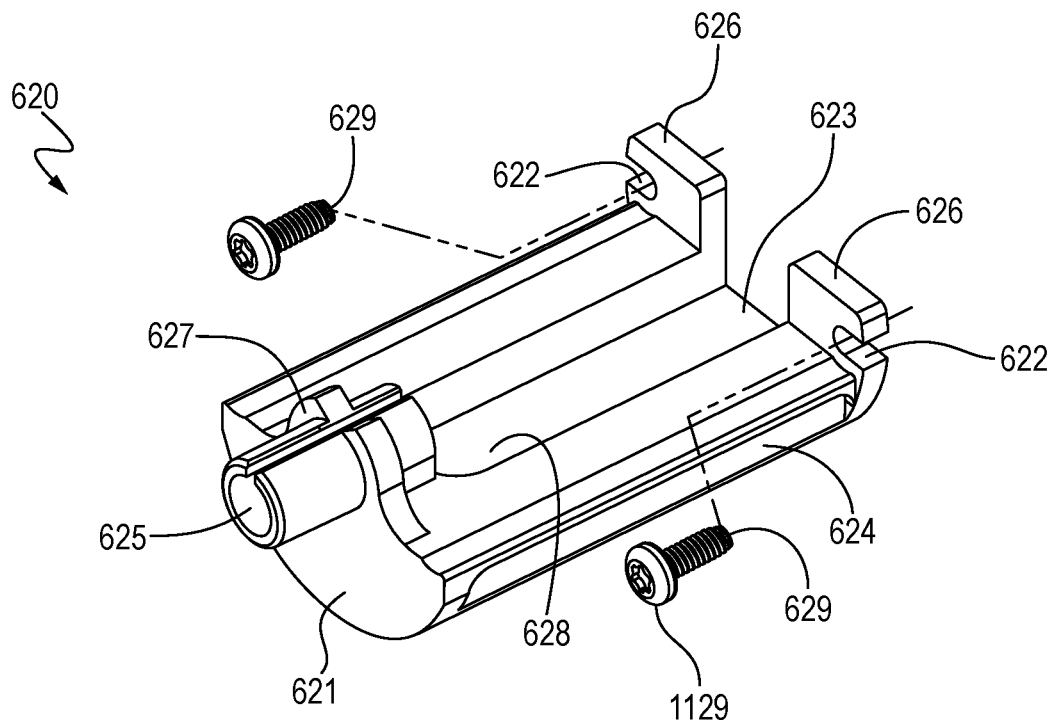
FIG. 9A is a perspective view of an eccentric weighted ballast. The ballast is designed to be secured to an end of the rail of FIG. 8A.

The through-openings 612 are dimensioned and configured to receive a bolt or screw or other securing member (shown at 629 in FIG. 9A). The securing members 629, in turn, connect the ends 632, 634 to respective ballasts (shown at 620 in FIG. 6A). In this respect, each ballast 620 contains through-openings (shown at 622 in FIG. 6A) which may be aligned with through-openings 612 of a respective end 632, 634 of the rail 630 for connection.

It is understood that the first 632 and second 634 flanges may be located on the distal ends of the two ballasts 620. In this case, the through-openings 622 would be positioned on opposing ends of the rail 630. Thus, the use of a flange for connecting the rail 630 to the ballasts 620 is not limited to the location of the flanges. In lieu of flanges and through-openings 622, a clocking mechanism could also be used to adjust the relative rotational positions of the ballasts 620 and the intermediate rail 630.

Each of the ends 632, 634 of the rail 630 comprises a central opening 615. The central openings 615 are dimensioned to receive the detonator cord 545. This allows the detonator cord 545 to pass from the detonator 560, through a central opening 615, into the rail 630, and on to the respective charges 540', 540".

The rail 630 further comprises a series of receptacles 635. The receptacles 635 are preferably equi-distantly spaced along the length of the rail 630. The receptacles 635 are uniquely configured to receive respective charge jackets 670. In one aspect, each receptacle 635 has radial edges 631 to accommodate the typically-circular shaped charges 540.

Figure 8B:
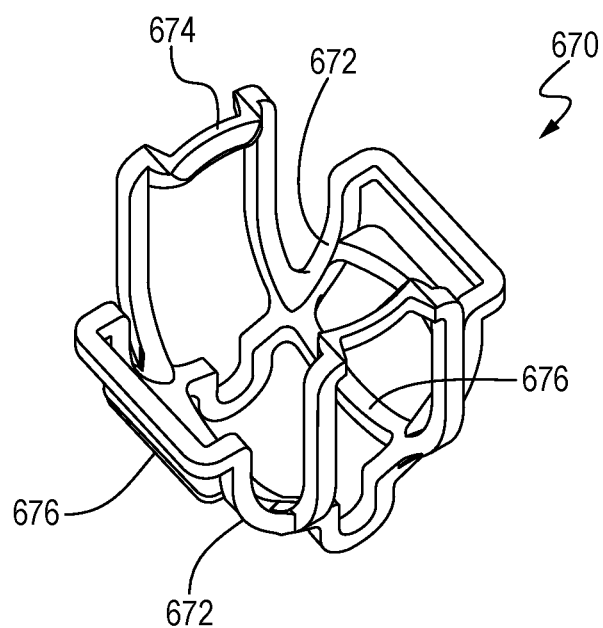
FIG. 8B is a perspective view of a charge jacket as may be used to secure a charge within the rail of FIG. 8A.

FIG. 8B is a perspective view of an illustrative charge jacket 670. The charge jacket 670 is preferably fabricated from a flexible polymeric material. The charge jacket 670 is dimensioned to receive and hold any off-the-shelf shaped charge 540' or 540". The flexible polymeric material of the charge jacket 670 allows the charge jacket 670 to hold the respective shaped charge 540' or 540" through a snap-fit arrangement.

The charge jacket 670 comprises a series of side rails 672. The side rails 672 are placed along opposing sides of the charge jacket 670. The side rails 672 help to support the shaped charges 540' or 540". The side rails 672 are also arranged to slidingly engage into cooperating grooves 632 adjacent each receptacle 635 in the rail 630. Thus, the side rails 672 play a role in holding the charges 540', 540" in place along the rail 630.

Returning to FIG. 6A, it can be seen that the charge jackets 670 have been slidden into place along each of the three receptacles 635 along the rail 630. Each of the charge jackets 670 is oriented in the same direction, to wit, 90 degrees from horizontal. This will cause the ensuing shots to be fired in the wellbore vertically.

As noted above, in FIG. 6A a single charge 540 is shown placed into a charge jacket 670. Upper transverse members (shown at 674 in FIG. 8B) hold the charge 540 in place when the charge 540 is placed within (or snapped into) the charge jacket 670. At the same time, lower transverse members (shown at 676 in in FIG. 8B) hold the charge 540 in place when the charge jacket 670 is lowered into a receptacle 635 of the rail 630.

Beneficially, the charge jacket 670 is fabricated from a compliant (or elastic) material, allowing it to be deformed as it is inserted into respective cooperating grooves 632 along the rail 630, and then return to its original shape to remain within the receptacle 635 of the rail 630. Similarly, the charge jacket 670 may be stretched to capture the shaped charge 540, and then rebound to its original shape to hold the charge 540 securely in place.

As noted, FIG. 6A also shows two ballasts 620. One ballast 620 is secured to the first end 632 of the rail 630 while the other ballast 620 is secured to the second end 634 of the rail 630. Each ballast 620 employs an identical semi-circular profile. Preferably, each ballast 620 is fabricated from cast zinc and is part of the ground path for the perforating gun assembly.

FIG. 9A is a perspective view of the ballast 620, in one embodiment. As the name implies, the ballast 620 comprises a weighted body 624. The weighted body 624 has a first end 621 and a second, opposing end 623. At the first end 621, the weighted body 624 supports a tubular member 625. The tubular member 625 is dimensioned to receive a bearing member (shown at 660 in FIGS. 6A and 6B). Specifically, the tubular member 625 receives the bearing member 660 around its outer diameter. Longitudinal movement of the bearing member 660 along the tubular member 625 is restricted by a shoulder 627 above the weighted member 624.

The second end 623 of the weighted body 624 comprises a pair of wings 626. Each wing 626 contains the through-opening 622 referenced above. When the through-openings 622 are aligned with through-openings 612 of the rail 630, a threaded connector 629 is placed through the aligned through-openings 622, 612. The threaded connectors 629 hold the ballast 620 in place relative to the rail 630 and supported charges 540', 540".

In an alternative arrangement, a pair of press-fit pins (not shown) are run into the aluminum flanges 632, 634 of the rail 630 to secure wings 626 to the opposing flanges 632, 634.

Figure 11:
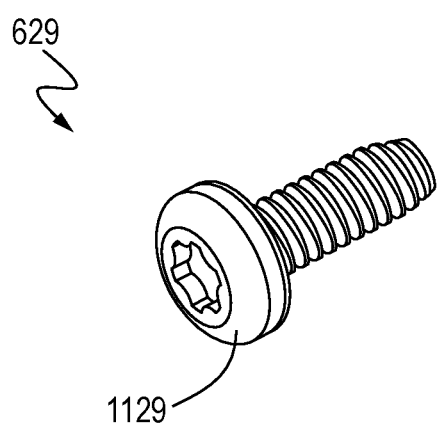
FIG. 11 is a perspective view of a threaded connector. The threaded connector is used to secure the ballast to an end of the rail.

Intermediate the first 621 and the second end 623 of the ballast 620 is a channel 628. Consistent with the semi-circular profile of the ballast 620, the channel 628 is open. The channel 628 is dimensioned to receive a signal transmission wire, such as wire 585 of FIG. 5B, extending down from an upstream perforating gun 410. Optionally, the channel 628 may secure the detonator 560. The channel 628 may also be used to contain an addressable switch 610 as shown in FIG. 5B;

FIG. 11 is a perspective view of a threaded connector 629, in one arrangement. The connector 629 comprises a threaded bolt and is dimensioned to extend through the aligned through-openings 622, 612. The connector 629 is screwed into the aligned through-openings 622, 612 from the direction of the ballast 630.

In a preferred embodiment, eight through-openings 622, 612 are provided on the end flanges 632, 634 to allow the operator to select a desired orientation for the charges 540', 540". A head 1129 serves as a stop member for the connector 629 that prevents the connector 629 from moving completely through the through-openings 622, 612 during assembly. Accordingly, the shoulder 1129 permits the connector 629 to thread into the through-openings 622, 612, secure the ballast members 620 to the rail 630, and prevent over-insertion of the connector 629 during assembly.

Figure 12A:
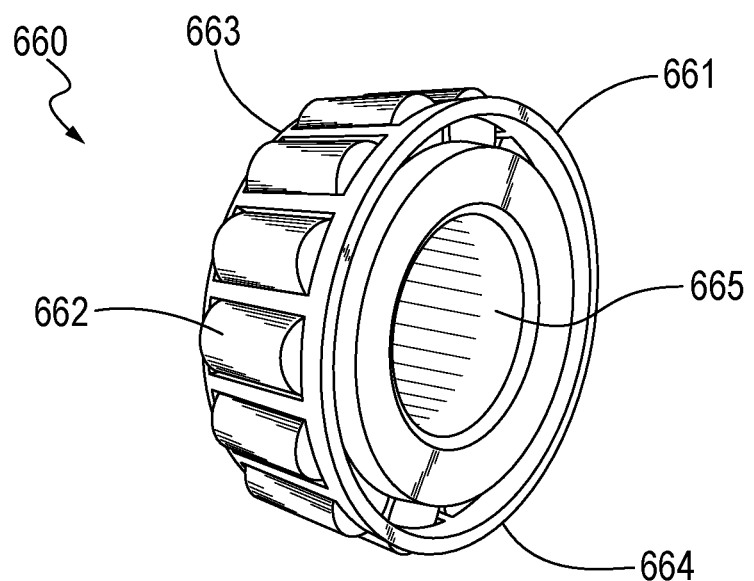
FIG. 12A is an enlarged perspective view of a bearing member. The bearing member provides relative rotational movement between a ballast and an associated tandem sub.
Figure 12B:
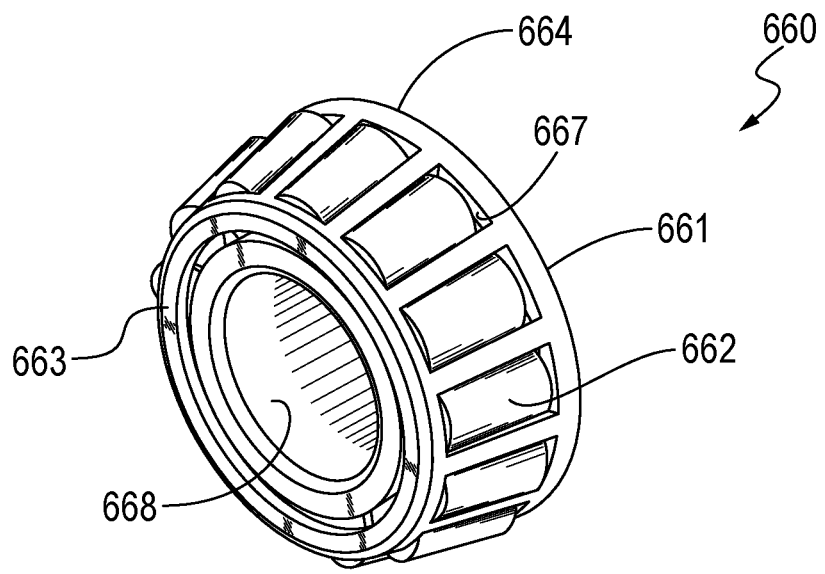
FIG. 12B is a second perspective view of the bearing member of FIG. 12A. Opposing ends of the bearing member are more clearly seen. The bearing member is seen from an end opposite that of FIG. 12A.

FIG. 12A is an enlarged perspective view of a bearing member 660. The bearing member 660 has a frusto-conical profile, with a central bore 665. The central bore 665 is dimensioned to closely receive the tubular support member 625 at the first (or distal) end 621 of the ballast 620. FIG. 12B is a second perspective view of the bearing member 660 of FIG. 12A, seen from an end opposite that of FIG. 12A.

The bearing member 660 includes a plurality of individual roller bearings 662. The roller bearings 662 are secured within a housing 664, forming a race for the bearings 662. The bearings 662 interface with the second conical opening 270" of the tandem sub 225, meaning that the roller bearings 662 permit the bearing member 660 to rotate within the second conical opening 270". In this way, the bearing member 660 provides relative rotational movement between the tandem sub 225 and the ballast 620 (and its connected rail 630 and supported shaped charges 540', 540") within the gun barrel housing 410.

Figure 12C:
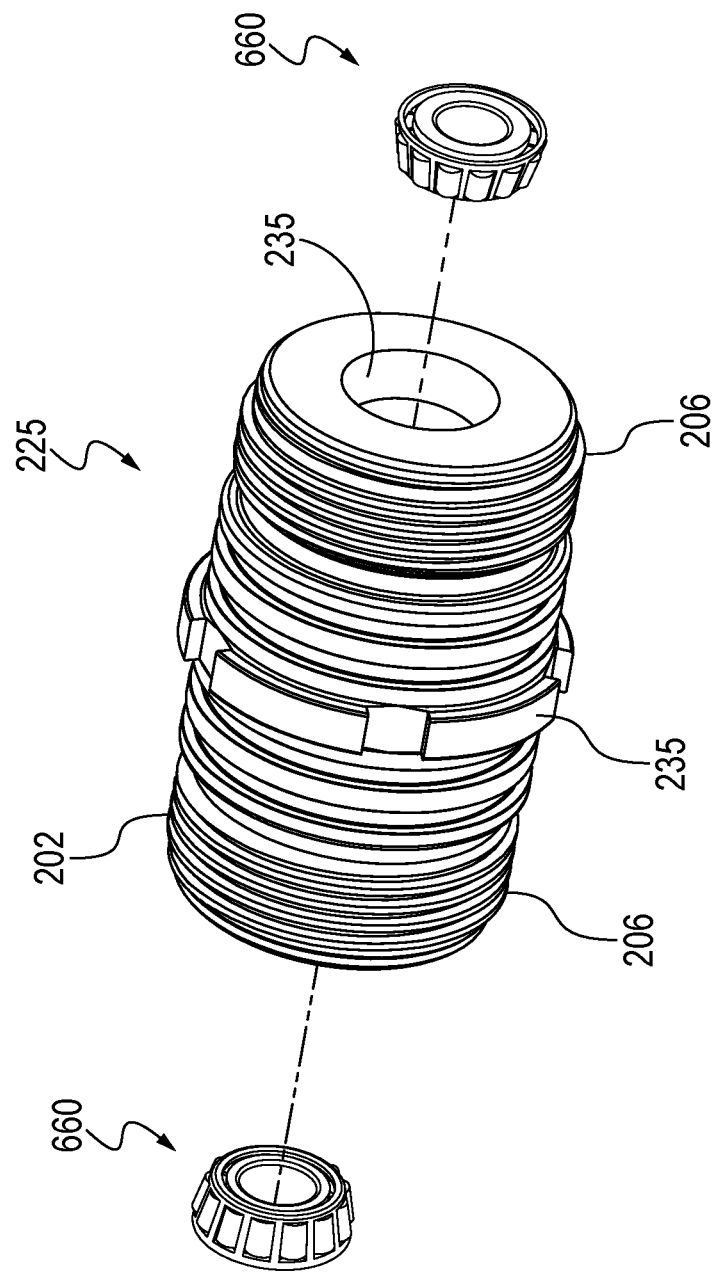
FIG. 12C is a perspective view of a tandem sub. Bearing members from FIGS. 12A and 12B are seen in exploded apart relation on opposing ends of the tandem sub.

FIG. 12C is a third perspective view of the bearing member 660 of FIG. 12A. Here, two opposing bearing members 660 are shown in exploded apart relation from a tandem sub 225. Each bearing member 660 is dimensioned and configured to slide into the bore 235 of the tandem sub 225 and engage a conical surface 270', 270". (The conical surfaces 270', 270" are shown in FIG. 10A, discussed below.)

Stated another way, each bearing member 660 is designed to engage with a tandem sub 225, wherein the tandem sub 225 comprises a first end 202, a second end 204 opposite the first end 202, connection threads 206 placed at each of the first 202 and second 204 ends, an internal bore 235 within the tandem sub 225 extending from the first end 202 to the second end 202. As shown in FIG. 10A, the tandem sub 225 includes a pair of tapered shoulders 270', 270" along the inner bore 235.

Each bearing member 660 comprises a first end, or shoulder 661, defining a first outer diameter. In addition, each bearing member 660 comprises a second end, or shoulder 663, defining a second outer diameter. The second outer diameter is smaller than the first outer diameter creating the frusto-conical profile. The angle of the frusto-conical profile will match the angle of the tapered shoulder 270' or 270".

A tubular support body 668 extends between the first shoulder 661 and the second shoulder 663. The support body 668 is dimensioned to receive the post 625 of the ballast 620 while supporting the bearing member 660.

A plurality of roller bearings 662 is disposed around the support body 664 intermediate the first shoulder 661 and the second shoulder 663. The plurality of roller bearings 662 is configured to bearingly engage the tapered shoulder 270' along the inner bore 235 of the tandem sub 225. The roller bearings 662 are contained within the housing 664. At the same time, the housing 664 provides windows 667 for receiving respective roller bearings 662.

Figure 6B:
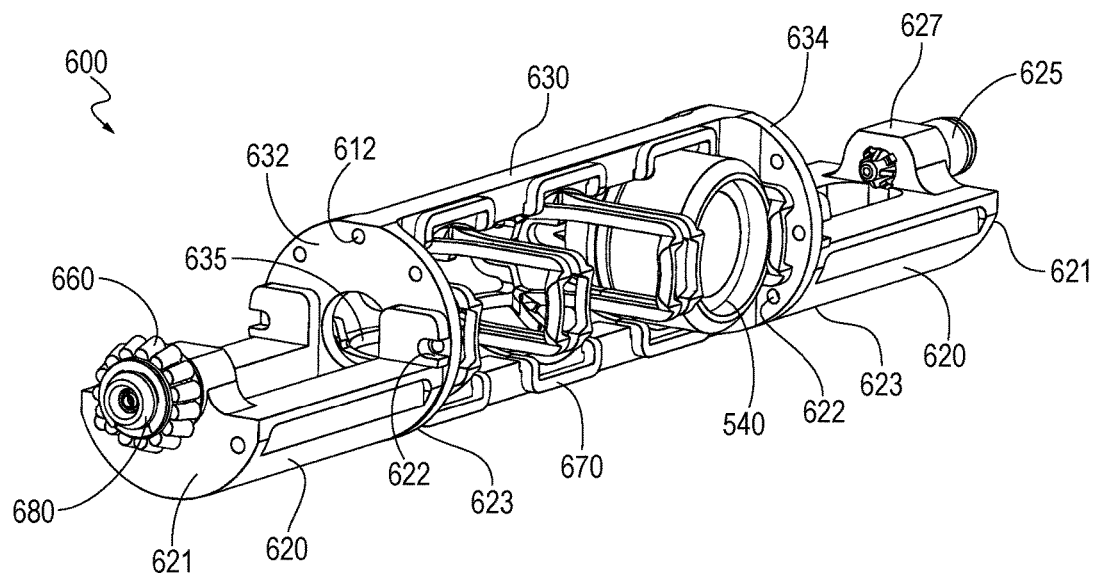
FIG. 6B is a second perspective view of the rail system of FIG. 6A. In this view, each shot is to be oriented 90 degrees.

The position of the bearing member 660 is shown in FIG. 6B. FIG. 6B is a second perspective view of the rail system 600 of FIG. 6A. The bearing member 660 is seen secured over the post 625 at the first end 621 of a ballast 620. In turn, a flange 680 at the end of the post 625. The flange 680 is associated with a connector housing (shown at 580 in FIG. 13B). As discussed below, the connector housing 580 serves multiple purposes including receiving the female banana plug terminal 558, holding the bearing 660 in place on the ballast post 625, and supporting the wire 585 that is connected (crimped or soldered) onto the female banana plug terminal 558. At the same time, the banana plug terminal transmits an electronic signal to the wire 585, which then transmits the signal to an addressable switch which completes the circuit by grounding to the bearing member 660 and further to the tandem sub 225.

Of interest, the bearings 662 interface with only the ID of the tandem subs 225; they do not interface with the ID of the surrounding gun barrel housing 410. This allows for the use of smaller bearings 662, which in turn allows for reduced cost and lower friction.

The frusto-conical, or tapered, roller bearings 662 have a high side load rating and better durability. The tapered arrangement for the roller bearings 662 also provides a better electrical/ground connection with a bigger surface area of contact to improve electrical communication. Those of ordinary skill in the art may understand that the tandem subs 225 are cleaner and offer more reliable ground surfaces than the ID's of traditional gun barrels.

In one embodiment, roller bearings are placed within a cage that is integral to the tapered surfaces 270', 270" along the inner bore 235 of the tandem sub 225. In this instance, the race may be an inner race that forms a portion of the inner bore 235, while the housing 664, or cage, is built onto the inner bore 235. A space is preserved between the inner race and the cage which houses the roller bearings. Each ballast 620 would employ a matching angle tapered surface at its first end 621. For example, the post 625 could be modified to include a tapered, or frusto-conical, surface.

In one aspect, the tapered shoulder 270' or 270" represents a tubular adapter, e.g., one to three inches, that is not machined directly into the sub, but instead simply abuts or attaches to an end of the tandem sub 225 to create the tapered surface at this location. In this instance, the tubular adapter has an outer diameter that is the same as the outer diameter of the tandem sub 225, but employs the tapered shoulder 270' or 270" along its inner bore. The bearing member 660 engages the tapered shoulder of the end cap. For purposes of the claims herein, the end cap essentially becomes a part of the tandem sub 225 once it is screwed on.

It is observed that in FIG. 6B, the rail 630 and supported charge jackets 670 have been rotated 90 degrees relative to the view of FIG. 6A. This is because the first end 632 of the rail 630 has been rotated 90 degrees before being secured to the second end 623 of the ballast 620. The result is that the shaped charge 540 is now oriented 90 degrees from vertical. This is a preferred orientation of the charge 540 as it ensures that shots will be fired parallel to a plane of completion of the horizontal portion 156 of the wellbore 100. This also allows the operator to take advantage of the plane of least resistance, or "least principal stress," within the formation 115 to maximizes fracture formation away from the wellbore 100 and within the stress field.

Figure 6C:
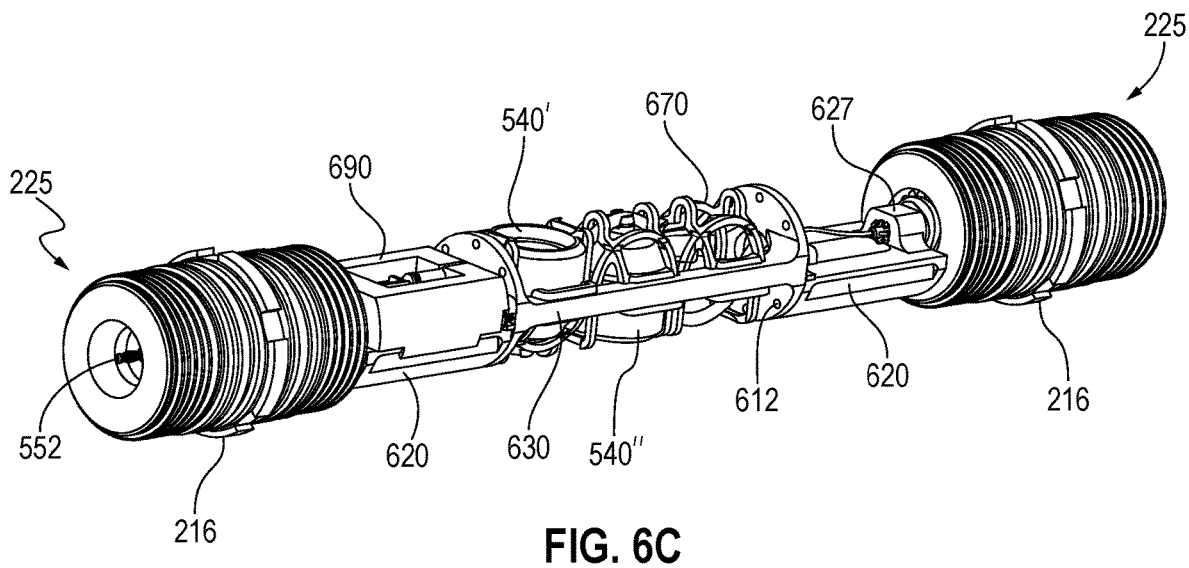
FIG. 6C is a third perspective view of the rail system of FIG. 6A. In this view, one shot is oriented at 0 degrees while a second shot is oriented at 180 degrees. Tandem subs are shown at the distal ends of respective ballasts.

FIG. 6C is a third perspective view of the rail system 600 of FIG. 6A. In this view, one shot 540' is oriented at 0 degrees while another shot 540" is oriented at 180 degrees. Thus, the shaped charges 540', 540" may be installed along the rail 630 in either an "up" or a "down" direction. "Up" may be considered a "0 degree" orientation while down may be considered a "180 degree" orientation. This arrangement may be desirable to help minimize fracture communication with a so-called parent wellbore in the field. In this respect, fractures are led to propagate up and down rather than sideways.

In the arrangement of FIGS. 6A, 6B and 6C, each weighted ballast 620 has an eccentric profile. The weight bodies 624 have rotated into a downward position. Knowing that this will take place when the perforating gun assembly 400 has been pumped into a horizontal leg 156, the operator can pre-select an orientation (reflecting both a direction and an angle relative to the central axis of the wellbore) at which shots will be fired into the formation 115.

Figure 9B:
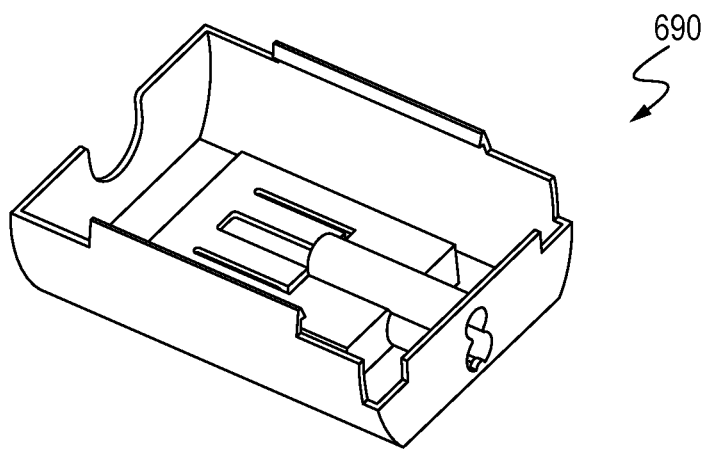
FIG. 9B is a perspective view of a cover. The cover is intended to be fitted over the weighted ballast of FIG. 9A. The cover protects wires that extend from the contact pin down into the gun barrel housing along with a detonator and an addressable switch.

FIG. 9B is a perspective view of a cover 690. The cover 690 is intended to be fitted over the weighted body 624 of FIG. 9A. Specifically, the cover 690 fits over the open channel 628 to protect wires that extend from the contact pin 550, or wires (sec in FIG. 13A at 565N, 565P) that extend from the detonator 560, an addressable switch 610, and any other components of the perforating gun assembly 400. The cover 690 may be fabricated from a metal or from a durable plastic.

FIG. 10A is a cross-sectional view of the tandem sub 225 of the present invention, in a first embodiment. As can be seen, the tandem sub 225 has a bore 235 that extends from the first end 202 to the second end 204. A first tapered shoulder 270' is provided along the bore 235 (or inner diameter) at the first end 202 of the tandem sub 225. Similarly, a second tapered shoulder 270" is provided along the bore 235 at the second end 204 of the tandem sub 225.

FIG. 10B is a cross-sectional view of a tandem sub 1025 of the present invention, in a second embodiment. Here, a bearing member 1060 is integral to the tandem sub 1025. The bearing member 1060 is similar to the bearing member 660. In this respect, the bearing member 1060 will have a plurality of roller bearings 662 that are housed within a cage 1065. However, in this instance the race for the roller bearings 662 will be the respective tapered shoulders 270', 270".

FIG. 10C is an enlarged view of an end of the tandem sub 1025 of FIG. 10B. Here, the cage 1065 is shown more visibly. It is understood that the cage 1065 is frusto-conical in profile and has a plurality of windows through which respective roller bearings extend. Thus, the cage 1065 serves as a bearing housing that is integral to the body of the tandem sub 1025.

Figure 13A:
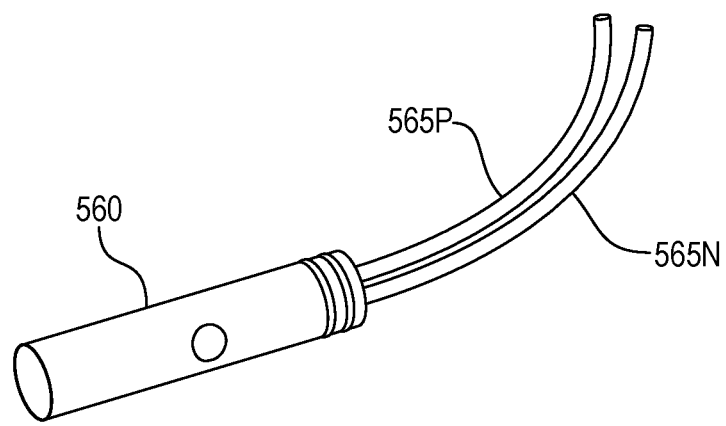
FIG. 13A is a perspective view of a detonator. Extending from the detonator is a pair of wires.

FIG. 13A is a perspective view of a detonator 560. The detonator 560 defines a small aluminum housing having a resistor (not seen) inside. The detonator 560 receives electrical energy from the surface 105 and through a pair of wires. These represent a positive wire 565P and a negative wire 565N. Current supplied by the electrical energy from the surface 105 heats the resistor within the detonator 560.

Figure 13B:
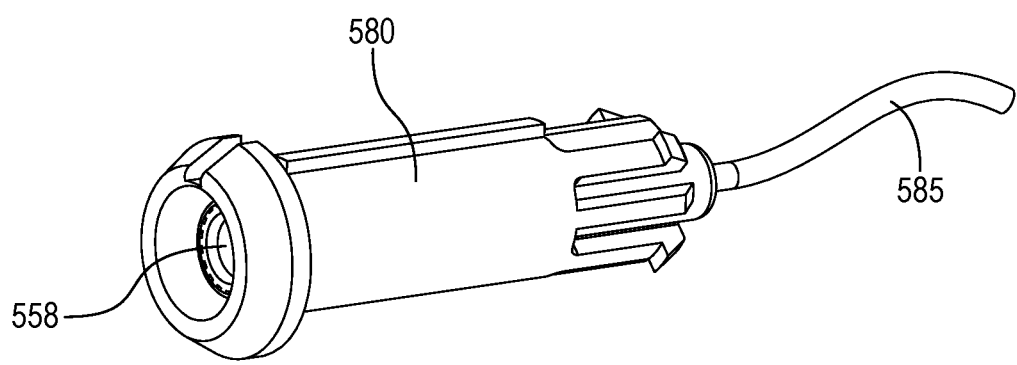
FIG. 13B is a perspective view of a connector housing. The connector housing is designed to secure a female banana plug terminal along the rail of FIG. 8A. A wire is seen extending from the connector housing, which is crimped or otherwise connected to the banana plug terminal.

FIG. 13B is a perspective view of the connector housing 580 referenced above. The connector housing 580 is designed to secure the bearing member 660 onto the post 625. Specifically, the connector housing 580 snaps into the bore of the post 625. In addition, the connector housing 580 receives the female banana plug 558. The connector housing 580 is fabricated from a non-conductive composite material.

In operation, the operator will send an electrical signal from the surface 105, down the electric wireline 240, through the body of the contact pin 550, through the female banana plug 558, to the addressable switch 610, into one of the detonator wires (such as 565P), travel into the detonator 560 inside of the gun barrel housing 410, and then return to ground through another one of the detonator wires (such as 565N). The detonator 560 is packed with an explosive such as RDX. When current is run through the detonator 560, a small explosion is set off by the electrically heated resistor. This small explosion then sets off the detonator cord 545 along the selected gun barrel housing 410.

Of interest, the second detonator wire is connected to the ballast 620, which is fabricated from a conductive material. The ballast 620, in turn is grounded to the bearing assembly 660 and the tandem sub 225. The bearing member 660 is in electrical communication with the tandem sub 225 and then the gun body 410 through the bearing members 662. In this way, the bearing member 660 plays a role in grounding the perforating gun assembly.

In practice, a gun barrel housing 410 may have a tandem sub 225, a bearing member 660, a ballast 620 and a rail 630 (or explosive charge holder) at its first 412 end and, optionally, also at its second 414 end. In this instance, a grounding wire (such as wire 565N) is in electrical communication with the gun barrel housing 410 through the bearing members 660 at both ends 412, 414. The benefit is that each end (412 may be the upstream end and 414 may be the downstream end) is part of the same ground circuit. In the unlikely event that one ground fails (such as through dirt on the roller bearings 662 of one bearing member 660 or because a ground wire 565N becomes disengaged), the perforating gun assembly is still grounded through the other bearing member 660. In other words, the ground path is redundantly designed.

The bearing connection (including bearing members 662) provided between the tandem sub 225 and the ballast 620 also provides the operator with at least some measure of control concerning the orientation (or altitude) of charges 540', 540" fired into the surrounding formation 115. In this respect, once the perforating gun assembly 400 (that is, the tandem subs 225, the gun barrel housing 410, and the rail system 600 within the gun barrel housing 410) enters the horizontal leg 156 of the wellbore 110, the weighted bodies 624 of the ballasts 620 will roll downward. Because the ballasts 620 are secured to the ends 632, 634 of the rail 630, the rail 630 and its supported charges 540", 540" will rotate with the ballasts 620. The rail 630 is symmetrically balanced to be "neutral," allowing the conductive ballasts 620 to fully dictate the direction the charges 540", 540" will face.

Beneficially, no charge tubes are required for placement within the gun barrel housing 410. In this respect, the rail system 600 supports the charges 540', 540" along the gun barrel housing 410 rather than a charge tube. In addition, no metal end plates are required at the ends 202, 204 of the tandem subs 225. Instead, the ballasts 620 and rail 630 provide structural support for the detonator 560 and associated charges 540', 540".

Figure 14A:
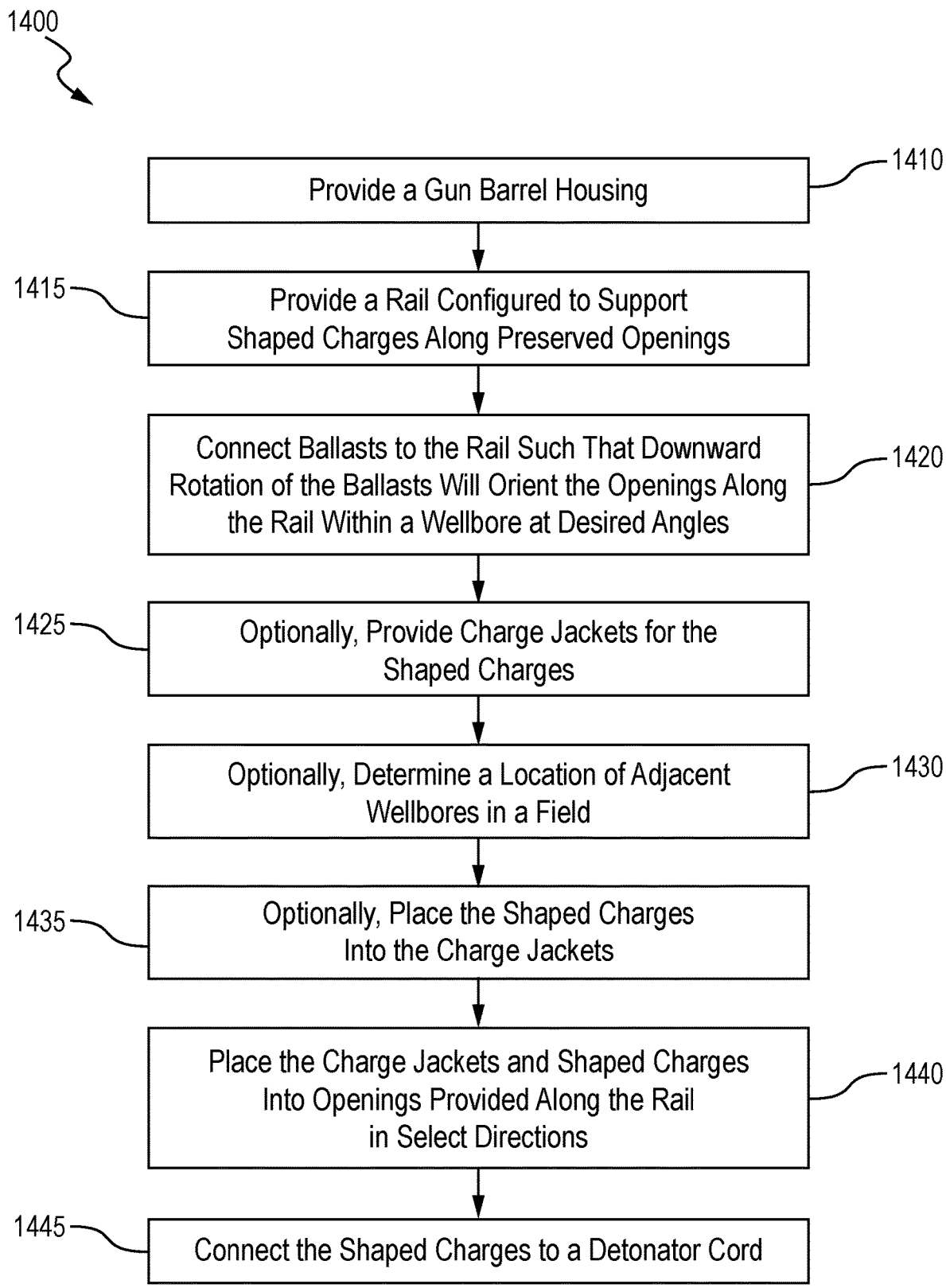
FIGS. 14A and 14B together present a single flow chart. The flow chart provides steps for a method of orienting shots during a formation fracturing operation.
Figure 14B:
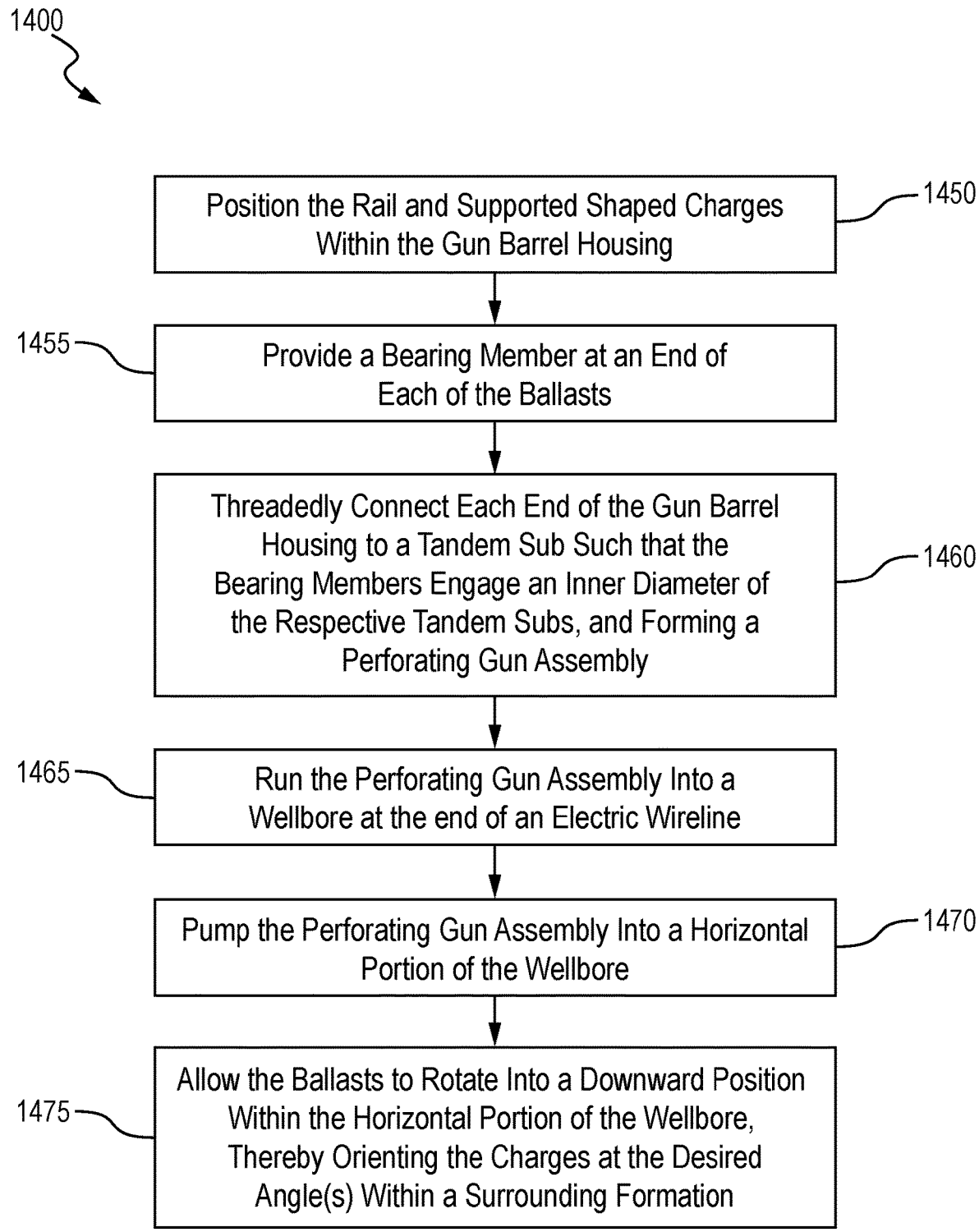

Based on the tandem subs 225, the eccentric ballasts 620, and the unique bearing connection between the tandem subs 225 and the ballasts 620 within the gun barrel housing 410, a method of orienting shots during a formation fracturing operation is provided herein. FIGS. 14A and 14B together present a single flow chart showing steps for a method 1400 of orienting shots in a perforating gun assembly.

In one embodiment, the method 1400 first comprises providing a gun barrel housing. This is shown in Box 1410 of FIG. 14A. The gun barrel housing may be in accordance with the illustrative gun barrel housing 410 presented in FIG. 4B.

The method 1400 also includes providing a rail. This is seen in Box 1415. The rail is configured to support charges (such as shaped charges) along a frame. Specifically, receptacles are provided along the frame in a preferably equidistantly spaced array in order to receive the shaped charges. The rail may be in accordance with the rail 630 shown in FIG. 8A.

The method 1400 additionally comprises connecting ballasts to ends of the rail. This is offered in Box 1420. The ballasts are connected using threaded cutting screws that are run into aligned through-openings. In an alternate embodiment, the ballasts may be connected via screws (such as connector 629 of FIG. 11), that are run through the aligned through-openings. Each of the ballasts may be in accordance with the ballast 620 of FIG. 9A.

In operation, the ballasts are connected to opposing ends of the rail. The ballasts are connected such that when the gun barrel housing is pumped into a horizontal leg of a wellbore, the ballasts will be gravitationally rotated into a downward position. This downward rotation of the ballasts will turn the receptacles along the rail within the wellbore at desired orientations.

The method 1400 also includes the optional step of providing charge jackets for the shaped charges. This is provided in Box 1425. Each charge jacket is dimensioned to receive and hold any "off-the-shelf" shaped charge. The charge jackets may be in accordance with charge jacket 670 of FIG. 8B.

The method 1400 also comprises the optional step of determining a location of adjacent wellbores in a hydrocarbon producing field. This is shown at Box 1430. Those of ordinary skill in the art will understand that the hydrocarbon field may, and likely will, comprise numerous wells. In connection with so-called in-fill drilling, new wells are drilled in relative proximity to existing wells. The new well is sometimes referred to as a "child wellbore" or an "offset well," while an existing adjacent well may be referred to as a "parent wellbore."

In this instance, the operator may desire that shots be fired not only horizontally, but also in one direction only, that is, away from a parent wellbore. This assists the service company in generating and propagating fractures in a particular part of the formation to avoid frac hits. Those of ordinary skill in the art will appreciate that frac hits are generally a by-product of in-fill drilling. Frac hits are also, of course, a by-product of tight well spacing, that is, wells spaced in close proximity to one another in the same field. Ultimately, however, frac hits are the result of the operator being unable to control or "direct" the propagation of fractures within the pay-zone. By firing shots away from a direction of a parent well, the likelihood of a frac hit occurring is reduced.

The method 1400 further includes the step of placing the shaped charges into the charge jackets. This is provided at Box 1435. Thereafter, the charge jackets are inserted into receptacles (such as receptacles 635) provided along the rail. This is shown at Box 1440.

It is noted that in lieu of charge jackets, the operator may simply clip the shaped charges onto the receptacles. What is important is that the charge jackets are inserted in select directions. Depending on the placement of the charges along the rail and the angle at which the ballasts are secured to the rail, charges may be shot at a variety of orientations. Examples may be 90-90-90, 270-270-90, 0-90-180, etc.

Beneficially, this allows the operator to orient charges away from a known pressure sink in the formation, such as a pressure sink caused by a parent wellbore in the same field. To facilitate this, the charge jackets are run into the rail from only one direction, e.g., 0-0-0, 90-90-90, 180-180-180, or 270-270-270. This minimizes the chances of a frac hit occurring during formation fracturing.

Optionally, charge jackets may be placed along the rail in a way that charges will fire vertically, e.g., 0-180-0. This too may minimize the chances of a frac hit occurring during formation fracturing. Of course, the rail may be connected to the ballasts at any angle and the charges may be inserted into the rail receptacles from either direction, providing a high degree of pre-selection for the orientation of the charges.

The method 1400 additionally includes connecting the charges to a detonator cord. This is offered in Box 1445. The operator then positions the rail and the supported charges within the gun barrel housing. This is seen in Box 1450 of FIG. 14B.

As discussed above, the novel perforating gun assembly described herein offers a bearing connection within the gun barrel housing. Thus, in Box 1455 the method includes the step of providing a bearing member at an end of each ballast. Each of the bearing members may be in accordance with the bearing member 660 of FIG. 12. In this respect, the bearing members form a frusto-conical profile, mating with a conical inner diameter section along a tandem sub.

The method 1400 next includes threadedly connecting each end of the gun barrel housing to a tandem sub. This is seen in Box 1460. Upon connection, the bearing members engage an inner diameter of the respective tandem subs. Together, the tandem subs, the gun barrel housing, the roller bearings (or bearing members), the ballasts, the rail, and the charges form a novel perforating gun assembly.

As an alternative, at least one bearing member is connected to an end plate, which in turn is connected to a gun barrel housing. The end plate comprises a short tubular body, such as one to three inches, that screws onto or otherwise attaches to the second end of the gun barrel housing. In this case, an opposite end of the end plate may screw into the first end of an adjoining gun barrel housing, or onto a setting tool for a plug, as the case may be.

The method 1400 may also include running the perforating gun assembly into a wellbore. This is provided at Box 1465. This step is typically done by running the perforating gun assembly into the wellbore at the end of an electric wireline (such as wireline 240 of FIG. 1). The perforating gun assembly is then pumped into a horizontal portion of the wellbore (such as horizontal leg 156 of FIG. 1). This is shown at Box 1470.

Once the perforating gun assembly is positioned within the horizontal wellbore, the ballasts are allowed to rotate into a downward position. This occurs automatically in response to the gravitational force acting on the weighted bodies. This step is shown in Box 1475. This rotation takes place through the bearing members. The result is that the shaped charges are oriented at a desired angle or direction within a surrounding formation.

It will be appreciated by the petroleum engineer that the size and orientation of a fracture, and the amount of hydraulic pressure needed to part the rock along a fracture plane, are dictated by the formation's in situ stress field. This stress field can be defined by three principal compressive stresses which are oriented perpendicular to one another. These represent a vertical stress, a minimum horizontal stress, and a maximum horizontal stress. The magnitudes and orientations of these three principal stresses are determined by the geomechanics in the region and by the pore pressure, depth, and rock properties.

According to principles of geomechanics, fracture planes will generally form in a direction that is perpendicular to the plane of least principal stress in a rock matrix. Stated more simply, in most wellbores, the rock matrix will part along vertical lines when the horizontal section of a wellbore resides below 3,000 feet, and sometimes as shallow as 2,000 feet, below the surface. In this instance, hydraulic fractures will tend to propagate from the wellbore's perforations in a vertical, elliptical plane perpendicular to the plane of least principal stress. If the orientation of the least principal stress plane is known, the longitudinal axis of the horizontal leg 156 is ideally oriented parallel to it such that the multiple fracture planes will intersect the wellbore 100 at, or near, orthogonal to the horizontal leg 156 of the wellbore 100.

The method 1400 may finally include sending an actuation signal down the electric line to initiate charges and to create perforations in a direction that is generally opposite from a direction of the parent wellbore, thus avoiding a frac hit in the hydrocarbon producing field while optimizing the creation of a fracture network within the formation. This may be a part of the step of Box 1475.

Further, variations of the tool and of methods for using the tool within a wellbore may fall within the spirit of the claims, below. It will be appreciated that the inventions are susceptible to other modifications, variations and changes without departing from the spirit thereof.

We claim:

1. A bearing assembly, comprising:
a tubular sub having a first end, and a second end opposite the first end;
connection threads placed at each of the first and second ends;
an internal bore within the tubular sub extending from the first end to the second end, and having a tapered shoulder residing along the internal bore at the second end, with the tapered shoulder defining an angle relative to a central axis of the internal bore and forming an inner race;
a contact pin residing within the internal bore of the tubular sub; wherein the contact pin is in electrical communication with a signal line, and is configured to receive a detonation signal from the signal line; and
a plurality of roller bearings disposed along the inner race, wherein the roller bearings are positioned at an angle that corresponds with the angle of the tapered shoulder; and
a cage securing the roller bearings against the inner race, the cage having a frusto-conical profile and being integral to the internal bore.

2. The bearing assembly of claim 1, further comprising:
a connector housing having a first end, a second end opposite the first end, and a bore residing within the connector housing;
wherein:
the connector housing is fabricated from a non-conductive material;
the first end of the connector housing extends into the internal bore of the tubular sub; and
the bearing assembly resides between the tapered shoulder of the internal bore of the tubular sub and the connector housing.

3. The bearing assembly of claim 2, further comprising:
a banana plug terminal residing at least partially within the bore of the connector housing; and
a conductive wire attached to the banana plug terminal within the bore of the connector housing;
wherein the banana plug terminal is configured to transmit an electrical signal to the conductive wire, which then transmits the electrical signal to an addressable switch, which completes a circuit by grounding to the bearing assembly and further to the tubular sub.

4. The bearing assembly of claim 1, wherein:
the tubular sub is a tandem sub for a perforating gun assembly;
the cage comprises a plurality of windows, with each window receiving a respective bearing member; and
each of the bearing members extends partially through its respective window to engage the inner race.

5. A bearing member assembly, comprising:
a tubular sub having a first end, and a second end opposite the first end, and connection threads placed at each of the first and second ends;
an internal bore within the tubular sub extending from the first end to the second end, and a tapered shoulder residing along the internal bore at the second end, with the tapered shoulder defining an angle relative to a central axis of the internal bore;
a contact pin residing within the internal bore of the tubular sub, the contact pin being in electrical communication with a signal line and configured to receive a detonation signal from the signal line; and
a bearing member comprising:
    a tubular support body having an inner diameter forming a bore, and an outer diameter forming a race;
    a plurality of roller bearings disposed along the race at an angle that corresponds with the angle of the tapered shoulder of the tubular sub; and
    a bearing housing configured to hold the plurality of roller bearings against the race, serving as a cage.

6. The bearing member assembly of claim 5, wherein the tubular sub is a tandem sub connected to a gun barrel housing.

7. The bearing member assembly of claim 6, wherein:
the bearing housing has a frusto-conical profile;
the bearing housing comprises a plurality of equi-distantly spaced windows; and
each of the windows receives a respective roller bearing.

8. The bearing member assembly of claim 6, further comprising:
a connector housing having a first end, a second end opposite the first end, and a bore residing within the connector housing;
wherein:
    the connector housing is fabricated from a non-conductive material;
    the first end of the connector housing extends into the internal bore of the tubular sub; and
    the bearing member resides between the tapered shoulder of the internal bore of the tubular sub and the connector housing.

9. The bearing member assembly of claim 8, further comprising:
a banana plug terminal residing at least partially within the bore of the connector housing; and
a conductive wire attached to the banana plug terminal within the bore of the connector housing;
and wherein the banana plug terminal is configured to transmit an electrical signal to the conductive wire, which then transmits the electrical signal to an addressable switch, which then completes a circuit by grounding to the bearing assembly and further to the tubular sub.

10. The bearing assembly of claim 9, wherein the conductive wire is attached to the banana plug terminal by crimping or by soldering.

* * * * *